United States Patent
Sumi et al.

(10) Patent No.: US 11,932,796 B2
(45) Date of Patent: Mar. 19, 2024

(54) LIQUID CRYSTAL COMPOSITION, LIQUID CRYSTAL CURED LAYER, OPTICAL FILM, POLARIZING PLATE, AND IMAGE DISPLAY DEVICE

(71) Applicant: FUJIFILM Corporation, Tokyo (JP)

(72) Inventors: Toshikazu Sumi, Kanagawa (JP); Toshihiro Konishi, Kanagawa (JP); Chie Moriya, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/886,025

(22) Filed: Aug. 11, 2022

(65) Prior Publication Data

US 2023/0130269 A1    Apr. 27, 2023

(30) Foreign Application Priority Data

Aug. 25, 2021    (JP) ................................. 2021-137410

(51) Int. Cl.
| | |
|---|---|
| *G02F 1/1333* | (2006.01) |
| *C09K 19/06* | (2006.01) |
| *C09K 19/38* | (2006.01) |
| *C09K 19/56* | (2006.01) |

(52) U.S. Cl.
CPC ........ *C09K 19/067* (2013.01); *C09K 19/3823* (2013.01); *C09K 19/56* (2013.01)

(58) Field of Classification Search
CPC .. C09K 19/067; C09K 19/3823; C09K 19/56; C09K 19/542; C09K 19/3491; C09K 19/3497; C09K 19/3804; C09K 2019/0444; C09K 2019/0448; G02F 1/1333
See application file for complete search history.

(56) References Cited

U.S. PATENT DOCUMENTS

| | | |
|---|---|---|
| 2015/0175564 A1 | 6/2015 | Sakamoto et al. |
| 2023/0130269 A1* | 4/2023 | Sumi .................... C09K 19/542 252/299.61 |

FOREIGN PATENT DOCUMENTS

| | | |
|---|---|---|
| JP | 2010-031223 A | 2/2010 |
| JP | 2016-081035 A | 5/2016 |
| WO | 2014/010325 A1 | 1/2014 |

\* cited by examiner

*Primary Examiner* — Geraldina Visconti

(74) *Attorney, Agent, or Firm* — Edwards Neils LLC; Jean C. Edwards, Esq.

(57) ABSTRACT

Provided are a liquid crystal composition, a liquid crystal cured layer, an optical film, a polarizing plate, and an image display device, each of which suppresses streak defects and has excellent temporal stability. The liquid crystal composition includes a liquid crystal compound and a basic compound, in which a pKa of a conjugate acid of the basic compound is 4 to 10.

18 Claims, 1 Drawing Sheet

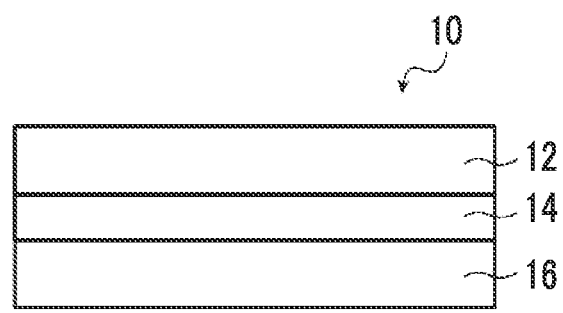

LIQUID CRYSTAL COMPOSITION, LIQUID CRYSTAL CURED LAYER, OPTICAL FILM, POLARIZING PLATE, AND IMAGE DISPLAY DEVICE

CROSS-REFERENCE TO RELATED APPLICATIONS

The present application claims priority under 35 U.S.C. § 119 to Japanese Patent Application No. 2021-137410, filed on Aug. 25, 2021. The above application is hereby expressly incorporated by reference, in its entirety, into the present application.

BACKGROUND OF THE INVENTION

1. Field of the Invention

The present invention relates to a liquid crystal composition, a liquid crystal cured layer, an optical film, a polarizing plate, and an image display device.

2. Description of the Related Art

Optical films such as an optical compensation sheet and a phase difference film are used in various image display devices in order to eliminate image coloration or expand a viewing angle.

A stretched birefringent film has been used as the optical film, but in recent years, it has been proposed to use an optical film having an optically anisotropic layer consisting of a liquid crystal compound instead of the stretched birefringent film.

As such an optical film, an optical film formed by using a composition containing a predetermined polymerizable compound and a polymerization initiator is known (see, for example, JP2010-031223A, WO2014/010325A, and JP2016-081035A).

SUMMARY OF THE INVENTION

The present inventors have examined the compositions described in JP2010-031223A, WO2014/010325A, and JP2016-081035A, and have thus clarified that precipitates were generated at the time of application, and these precipitates may cause streak-like film thickness unevenness (hereinafter also simply referred to as "streak defects").

In addition, the present inventors have clarified that in a case where an additive (for example, a non-liquid crystal compound) is blended from the viewpoint of suppressing the streak defects, the temporal stability of the compositions may be deteriorated depending on a type of the additive.

Therefore, an object of the present invention is to provide a liquid crystal composition, a liquid crystal cured layer, an optical film, a polarizing plate, and an image display device, each of which suppresses streak defects and has excellent temporal stability.

The present inventors have conducted intensive studies to accomplish the object, and as a result, they have found that a liquid crystal composition obtained by blending a basic compound whose conjugate acid has a pKa of 4 to 10 with a liquid crystal compound suppresses streak defects and has good temporal stability, thereby completing the present invention.

That is, the present inventors have found that the object can be accomplished by the following configurations.

[1] A liquid crystal composition comprising:
a liquid crystal compound; and
a basic compound,
in which a pKa of a conjugate acid of the basic compound is 4 to 10.

[2] The liquid crystal composition as described in [1],
in which a content of the basic compound is 0.01 to 5 parts by mass with respect to 100 parts by mass of the liquid crystal compound.

[3] The liquid crystal composition as described in [1] or [2],
in which the liquid crystal composition satisfies Expression (i) which will be described later.

[4] The liquid crystal composition as described in any one of [1] to [3],
in which the basic compound is a heterocyclic amine compound.

[5] The liquid crystal composition as described in any one of [1] to [4],
in which the basic compound is an aromatic heterocyclic amine compound.

[6] The liquid crystal composition as described in any one of [1] to [5],
in which the liquid crystal compound has a polymerizable group.

[7] The liquid crystal composition as described in any one of [1] to [6],
in which the liquid crystal compound is a compound represented by Formula (I) which will be described later.

[8] The liquid crystal composition as described in any one of [1] to [7],
in which the liquid crystal compound is a rod-like liquid crystal compound, and a refractive index difference $\Delta n$ between a major axis direction and a minor axis direction of the rod-like liquid crystal compound satisfies Expression (ii) which will be described later.

[9] The liquid crystal composition as described in any one of [ ] to [8],
in which the liquid crystal compound has any of aromatic rings selected from the group consisting of groups represented by Formulae (Ar-1) to (Ar-5) which will be described later.

[10] A liquid crystal cured layer obtained by immobilizing an alignment state of the liquid crystal composition as described in any one of [1] to [9].

[11] An optical film comprising:
the liquid crystal cured layer as described in [10].

[12] The optical film as described in [11],
in which the liquid crystal cured layer is formed on a surface of a photo-alignment film.

[13] The optical film as described in [11],
in which the liquid crystal cured layer is formed on a surface of another liquid crystal cured layer.

[14] A polarizing plate comprising:
the optical film as described in any one of [11] to [13].

[15] An image display device comprising:
the optical film as described in any one of [11] to [13] or the polarizing plate as described in [14].

[16] The image display device as described in [15],
in which the image display device is a liquid crystal display device.

[17] The image display device as described in [15],
in which the image display device is an organic EL display device.

According to the present invention, it is possible to provide a liquid crystal composition, a liquid crystal cured layer, an optical film, a polarizing plate, and an image display device, each of which suppresses streak defects and has excellent temporal stability.

BRIEF DESCRIPTION OF THE DRAWINGS

FIG. 1 is a schematic cross-sectional view showing an example of an optical film.

DESCRIPTION OF THE PREFERRED EMBODIMENTS

Hereinafter, the present invention will be described in detail.

Description of configuration requirements described below may be made on the basis of representative embodiments of the present invention in some cases, but the present invention is not limited to such embodiments.

Furthermore, in the present specification, a numerical value range expressed using "to" means a range that includes the preceding and succeeding numerical values of "to" as the lower limit value and the upper limit value, respectively.

In addition, in the present specification, only one kind of the substance corresponding to each component may be used alone or two or more kinds thereof may also be used in combination, for each component. Here, in a case where the two or more kinds of substances are used in combination for each component, the content of the component refers to a total content of the substances used in combination unless otherwise specified.

In addition, in the present specification, "(meth)acryl" is a notation representing "acryl" or "methacryl".

Moreover, in the present specification, the bonding direction of a divalent group (for example, —CO—O—) as noted is not particularly limited unless the bonding position is specified, and for example, in a case where $D^1$ in Formula (I) which will be described later is —CO—NR—, $D^1$ may be either *1-CO—NR—*2 or *1-NR—CO—*2, in which *1 represents a bonding position to the $G^1$ side and *2 represents a bonding position to the Ar side.

In the present specification, Re(λ) and Rth(λ) represent an in-plane retardation and a thickness direction retardation at a wavelength of λ, respectively. Furthermore, the wavelength of λ refers to 550 nm unless otherwise specified.

In addition, in the present specification, Re(λ) and Rth(λ) are values measured at a wavelength of λ in AxoScan OPMF-1 (manufactured by Opto Science, Inc.).

Specifically, by inputting the average refractive index ((nx+ny+nz)/3) and the film thickness (d (μm)) to AxoScan OPMF-1, it is possible to calculate:

slow axis direction (°)

$$Re(λ)=R0(λ)$$

$$Rth(λ)=((nx+ny)/2-nz)×d.$$

In addition, R0(λ) is expressed in a numerical value calculated with AxoScan OPMF-1, but means Re(λ).

Liquid Crystal Composition

The liquid crystal composition of an embodiment of the present invention is a liquid crystal composition including a liquid crystal compound and a basic compound, in which a pKa of a conjugate acid of the basic compound is 4 to 10.

In the present invention, as described above, the liquid crystal composition obtained by blending a basic compound whose conjugate acid has a pKa of 4 to 10 with a liquid crystal compound suppresses streak defects and has good temporal stability.

A reason why the effect is expressed is not specifically clear, but is presumed to be as follows by the present inventors.

That is, the present inventors have presumed that the streak defects were suppressed since generation of precipitates in a case of applying the liquid crystal composition was suppressed by blending a basic compound whose conjugate acid has a pKa of 4 or more to make the basic compound and the liquid crystal compound interact with each other.

In addition, the present inventors have presumed that the temporal stability was improved since the coloration of the liquid crystal composition over time was suppressed by blending a basic compound whose conjugate acid has a pKa of 10 or less.

Hereinafter, the respective components of the liquid crystal composition of the embodiment of the present invention will be described in detail.

Liquid Crystal Compound

The liquid crystal compound contained in the liquid crystal composition of the embodiment of the present invention is not particularly limited, and liquid crystal compounds known in the related art can be used.

In general, the liquid crystal compounds can be classified into rod-like type ones and disk-like type ones according to the shapes thereof. Further, each liquid crystal compound may be either a low-molecular-weight type or a high-molecular-weight type. The term, high-molecular-weight, generally refers to having a degree of polymerization of 100 or more (Polymer Physics-Phase Transition Dynamics, by Masao Doi, page 2, published by Iwanami Shoten, Publishers, 1992).

In the present invention, any of the liquid crystal compounds can be used, but the rod-like liquid crystal compound or the discotic liquid crystal compound (disk-like liquid crystal compound) is preferably used. Two or more kinds of the rod-like liquid crystal compounds, two or more kinds of the disk-like liquid crystal compounds, or a mixture of the rod-like liquid crystal compound and the disk-like liquid crystal compound may be used.

As the rod-like liquid crystal compound, for example, the rod-like liquid crystal compounds described in claim 1 of JP1999-513019A (JP-H11-513019A) or paragraphs [0026] to [0098] of JP2005-289980A can be preferably used, and as the discotic liquid crystal compound, for example, the discotic liquid crystal compounds described in paragraphs [0020] to [0067] of JP2007-108732A and paragraphs [0013] to [0108] of JP2010-244038A can be preferably used, but the rod-like liquid crystal compounds and the discotic liquid crystal compounds are not limited thereto.

In the present invention, it is preferable that the liquid crystal compound is a rod-like liquid crystal compound, and a refractive index difference Δn between the major axis direction and the minor axis direction satisfies Expression (ii) for a reason that the streak defects are further suppressed.

$$Δn(450)/Δn(550)<1.0 \tag{ii}$$

Here, in Expression (ii), Δn(450) represents a refractive index difference at 450 nm, and Δn(550) represents a refractive index difference at 550 nm.

In addition, the major axis direction of the rod-like liquid crystal compound means a direction of the longest axis in the molecule, and the minor axis direction means a direction orthogonal to the major axis direction.

In addition, the refractive index difference Δn for an optically anisotropic layer manufactured by using a rod-like liquid crystal compound is a value obtained by dividing a value (nm) of Re(λ) measured by the above-mentioned method by a value (nm) of the film thickness of the optically anisotropic layer. Furthermore, as the optically anisotropic layer to be measured, that is, an optically anisotropic layer manufactured by using a rod-like liquid crystal compound, an optically anisotropic layer manufactured by the following procedure is used.

That is, a liquid crystal composition L having the following composition is applied onto a glass substrate including a rubbing-treated polyimide alignment film (SE-150 manufactured by Nissan Chemical Industries, Ltd.) by spin coating.

Then, the coating film is heated and aligned at a temperature at which liquid crystallinity is exhibited, thereby forming a liquid crystal layer.

Next, the liquid crystal layer is cooled to a temperature that is 40° C. lower than the temperature at which liquid crystallinity is exhibited, the alignment is immobilized by irradiation with ultraviolet rays of 1,000 mJ/cm², thereby manufacturing an optically anisotropic film.

| Liquid crystal composition L | |
|---|---|
| Rod-like liquid crystal compound | 15.00 parts by mass |
| Photopolymerization initiator (Irgacure 819, manufactured by BASF) | 0.45 parts by mass |
| The following fluorine-containing compound A | 0.12 parts by mass |
| Chloroform | 35.00 parts by mass |

Fluorine-containing compound A

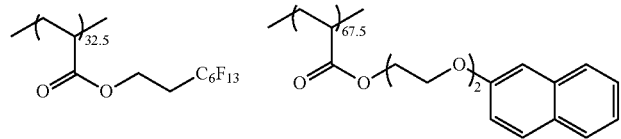

In the present invention, the liquid crystal compound preferably has a polymerizable group, and more preferably has two or more polymerizable groups for a reason that the durability of the liquid crystal cured layer is improved.

Here, examples of the polymerizable group include the same polymerizable groups described in $P^1$ and $P^2$ in Formula (I) which will be described later, and among those, the polymerizable group represented by any of Formulae (P-1) to (P-20) which will be described later is suitably mentioned.

In the present invention, it is preferable that the liquid crystal compound is a compound represented by Formula (I) for a reason that the liquid crystal alignment properties with a liquid crystal cured layer thus manufactured are improved.

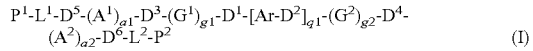

In Formula (I), a1, a2, g1, and g2 each independently represent 0 or 1. It should be noted that at least one of a1 or g1 represents 1, and at least one of a2 or g2 represents 1. In addition, in Formula (I), q1 represents 1 or 2.

Moreover, in Formula (I), $D^1$, $D^2$, $D^3$, $D^4$, $D^5$, and $D^6$ each independently represent a single bond; —CO—, —O—, —S—, —C(=S)—, —CR$^1$R$^2$—, —CR$^3$=CR$^4$—, —NR$^5$—, or a divalent linking group consisting of a combination of two or more of these groups, and $R^1$ to $R^5$ each independently represent a hydrogen atom, a fluorine atom, or an alkyl group having 1 to 12 carbon atoms. It should be noted that in a case where q1 is 2, a plurality of $D^2$'s may be the same as or different from each other.

In addition, in Formula (I), $G^1$ and $G^2$ each independently represent an aromatic ring having 6 to 20 carbon atoms, which may have a substituent, or a divalent alicyclic hydrocarbon group having 5 to 20 carbon atoms, which may have a substituent, and one or more of —CH$_2$—'s constituting the alicyclic hydrocarbon group may be substituted with —O—, —S—, or —NH—.

In addition, in Formula (I), $A^1$ and $A^2$ each independently represent an aromatic ring having 6 to 20 carbon atoms, which may have a substituent, or a divalent alicyclic hydrocarbon group having 5 to 20 carbon atoms, which may have a substituent, and one or more of —CH$_2$—'s constituting the alicyclic hydrocarbon group may be substituted with —O—, —S—, or —NH—.

Furthermore, in Formula (I), $L^1$ and $L^2$ each independently represent a single bond, a linear or branched alkylene group having 1 to 14 carbon atoms, or a divalent linking group in which one or more of —CH$_2$—'s constituting the linear or branched alkylene group having 1 to 14 carbon atoms are substituted with —O—, —S—, —NH—, —N(Q)—, or —CO—, where Q represents a substituent.

In addition, in Formula (I), $P^1$ and $P^2$ each independently represent a monovalent organic group, and at least one of $P^1$ or $P^2$ represents a polymerizable group. It should be noted that in a case where Ar is an aromatic ring represented by Formula (Ar-3), at least one of $P^1$ or $P^2$, or $P^3$ or $P^1$ in Formula (Ar-3) represents a polymerizable group. In addition, in Formula (I), Ar represents an aromatic ring having 6 to 20 carbon atoms, which may have a substituent, or a divalent alicyclic hydrocarbon group having 5 to 20 carbon atoms, which may have a substituent, and one or more of —CH$_2$—'s constituting the alicyclic hydrocarbon group may be substituted with —O—, —S—, or —NH—. It should be noted that in a case where q1 is 2, a plurality of Ar's may be the same as or different from each other.

In Formula (I), it is preferable that any of a1, a2, g1, and g2 is 1 for a reason that the liquid crystal composition of the embodiment of the present invention easily exhibits a liquid crystal state of a smectic phase.

In addition, it is preferable that both of a1 and a2 are 0 and both of g1 and g2 are 1 for a reason that the durability of a liquid crystal cured layer thus manufactured is improved.

In Formula (I), q1 is preferably 1.

In Formula (I), examples of the divalent linking group shown in one aspect of $D^1$, $D^2$, $D^3$, $D^4$, $D^5$, and $D^6$ include —CO—, —O—, —CO—O—, —C(=S)O—, —CR$^1$R$^2$—, —CR$^1$R$^2$—CR$^1$R$^2$—, —O—CR$^1$R$^2$—, —CR$^1$R$^2$—O—CR$^1$R$^2$—, —CO—O—CR$^1$R$^2$—, —O—CO—CR$^1$R$^2$—, —CR$^1$R$^2$—O—CO—CR$^1$R$^2$—, —CR$^1$R$^2$—CO—O—CR$^1$R$^2$—, —NR$^5$—CR$^1$R$^2$—, and —CO—NR$^5$—. $R^1$, $R^2$, and $R^5$ each independently represent a hydrogen atom, a fluorine atom, or an alkyl group having 1 to 12 carbon atoms.

Among these, any of —CO—, —O—, and —CO—O— is preferable.

In Formula (I), examples of the aromatic ring having 6 to 20 carbon atoms, shown in one aspect of $G^1$ and $G^2$, include an aromatic hydrocarbon ring such as a benzene ring, a naphthalene ring, an anthracene ring, and a phenanthroline ring; and an aromatic heterocyclic ring such as a furan ring, a pyrrole ring, a thiophene ring, a pyridine ring, a thiazole ring, and a benzothiazole ring. Among those, the benzene ring (for example, a 1,4-phenyl group) is preferable.

In Formula (I), the divalent alicyclic hydrocarbon group having 5 to 20 carbon atoms, shown in one aspect of $G^1$ and $G^2$, is preferably a 5- or 6-membered ring. In addition, the alicyclic hydrocarbon group may be saturated or unsaturated, but is preferably a saturated alicyclic hydrocarbon group. With regard to the divalent alicyclic hydrocarbon group represented by each of $G^1$ and $G^2$, reference can be made to, for example, the description in paragraph [0078] of JP2012-21068A, the contents of which are hereby incorporated by reference.

In the present invention, $G^1$ and $G^2$ in Formula (I) are each preferably a cycloalkane ring for a reason that the durability of a liquid crystal cured layer thus manufactured is improved.

Specific examples of the cycloalkane ring include a cyclohexane ring, a cyclopeptane ring, a cyclooctane ring, a cyclododecane ring, and a cyclodocosane ring. Among those, the cyclohexane ring is preferable, a 1,4-cyclohexylene group is more preferable, and a trans-1,4-cyclohexylene group is still more preferable.

In addition, in $G^1$ and $G^2$ in Formula (I), examples of a substituent which may be contained in the aromatic ring having 6 to 20 carbon atoms or the divalent alicyclic hydrocarbon group having 5 to 20 carbon atoms include an alkyl group, an alkoxy group, an alkylcarbonyl group, an alkoxycarbonyl group, an alkylcarbonyloxy group, an alkylamino group, a dialkylamino group, an alkylamide group, an alkenyl group, an alkynyl group, a halogen atom, a cyano group, a nitro group, an alkylthiol group, and an N-alkylcarbamate group, and among these, the alkyl group, the alkoxy group, the alkoxycarbonyl group, the alkylcarbonyloxy group, or the halogen atom is preferable.

As the alkyl group, a linear, branched, or cyclic alkyl group having 1 to 18 carbon atoms is preferable, an alkyl group having 1 to 8 carbon atoms (for example, a methyl group, an ethyl group, a propyl group, an isopropyl group, an n-butyl group, an isobutyl group, a sec-butyl group, a t-butyl group, and a cyclohexyl group) is more preferable, an alkyl group having 1 to 4 carbon atoms is still more preferable, and the methyl group or the ethyl group is particularly preferable.

As the alkoxy group, an alkoxy group having 1 to 18 carbon atoms is preferable, an alkoxy group having 1 to 8 carbon atoms (for example, a methoxy group, an ethoxy group, an n-butoxy group, and a methoxyethoxy group) is more preferable, an alkoxy group having 1 to 4 carbon atoms is still more preferable, and the methoxy group or the ethoxy group is particularly preferable.

Examples of the alkoxycarbonyl group include a group in which an oxycarbonyl group (—O—CO— group) is bonded to the alkyl group exemplified above, and among these, the alkoxycarbonyl group is preferably a methoxycarbonyl group, an ethoxycarbonyl group, an n-propoxycarbonyl group, or an isopropoxycarbonyl group, and more preferably the methoxycarbonyl group.

Examples of the alkylcarbonyloxy group include a group in which a carbonyloxy group (—CO—O— group) is bonded to the alkyl group exemplified above, and among these, the alkylcarbonyloxy group is preferably a methylcarbonyloxy group, an ethylcarbonyloxy group, an n-propylcarbonyloxy group, or an isopropylcarbonyloxy group, and more preferably the methylcarbonyloxy group.

Examples of the halogen atom include a fluorine atom, a chlorine atom, a bromine atom, and an iodine atom, and among these, the fluorine atom or the chlorine atom is preferable.

In Formula (I), examples of the aromatic ring having 6 to 20 or more carbon atoms, shown in one aspect of $A^1$ and $A^2$, include the same ones as those described in $G^1$ and $G^2$ in Formula (I).

In addition, in Formula (I), examples of the divalent alicyclic hydrocarbon group having 5 to 20 carbon atoms, shown in one aspect of $A^1$ and $A^2$, include the same ones as those described in $G^1$ and $G^2$ in Formula (I).

Moreover, in $A^1$ and $A^2$, examples of the substituent which may be contained in the aromatic ring having 6 to 20 carbon atoms or the divalent alicyclic hydrocarbon group having 5 to 20 carbon atoms include the same ones as those of the substituent which may be contained in each of $G^1$ and $G^2$ in Formula (I).

Suitable examples of the linear or branched alkylene group having 1 to 14 carbon atoms, shown in one aspect of $L^1$ and $L^2$, in Formula (I) include a methylene group, an ethylene group, a propylene group, a butylene group, a pentylene group, a hexylene group, a methylhexylene group, and a heptylene group. Furthermore, $L^1$ and $L^2$ may be a divalent linking group in which one or more of —$CH_2$—'s constituting the linear or branched alkylene group having 1 to 14 carbon atoms are substituted with —O—, —S—, —NH—, —N(Q)—, or —CO—, and examples of the substituent represented by Q include the same ones as those of the substituent which may be contained in each of $G^1$ and $G^2$ in Formula (I).

In Formula (I), examples of the monovalent organic group represented by each of $P^1$ and $P^2$ include an alkyl group, an aryl group, and a heteroaryl group. The alkyl group may be linear, branched, or cyclic, but is preferably linear. The number of carbon atoms of the alkyl group is preferably 1 to 30, more preferably 1 to 20, and still more preferably 1 to 10. Further, the aryl group may be a monocycle or a polycycle, but is preferably the monocycle. The number of carbon atoms of the aryl group is preferably 6 to 25, and more preferably 6 to 10. Further, the heteroaryl group may be a monocycle or a polycycle. The number of heteroatoms constituting the heteroaryl group is preferably 1 to 3. The heteroatom constituting the heteroaryl group is preferably a nitrogen atom, a sulfur atom, or an oxygen atom. The number of carbon atoms of the heteroaryl group is preferably 6 to 18, and more preferably 6 to 12. In addition, the alkyl group, the aryl group, and the heteroaryl group may be unsubstituted or have a substituent. Examples of the substituent include the same ones as those of the substituent which may be contained in each of $G^1$ and $G^2$ in Formula (I).

In Formula (I), the polymerizable group represented by at least one of $P^1$ or $P^2$ is not particularly limited, but is preferably a polymerizable group which is radically polymerizable or cationically polymerizable.

A known radically polymerizable group can be used as the radically polymerizable group, and suitable examples thereof include an acryloyloxy group or a methacryloyloxy group. In this case, it is known that the acryloyloxy group generally has a high polymerization rate, and from the viewpoint of improvement of productivity, the acryloyloxy group is preferable but the methacryloyloxy group can also be used as the polymerizable group.

A known cationically polymerizable group can be used as the cationically polymerizable group, and specific examples thereof include an alicyclic ether group, a cyclic acetal group, a cyclic lactone group, a cyclic thioether group, a spiroorthoester group, and a vinyloxy group. Among those, the alicyclic ether group or the vinyloxy group is suitable, and an epoxy group, an oxetanyl group, or the vinyloxy group is particularly preferable.

Particularly preferred examples of the polymerizable group include a polymerizable group represented by any of Formulae (P-1) to (P-20).

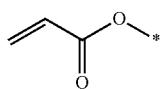
(P-1)

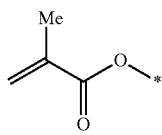
(P-2)

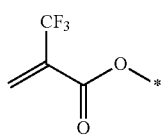
(P-3)

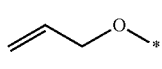
(P-4)

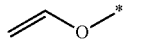
(P-5)

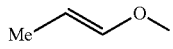
(P-6)

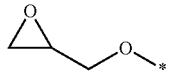
(P-7)

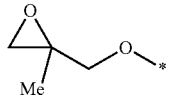
(P-8)

(P-9)

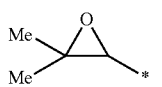
(P-10)

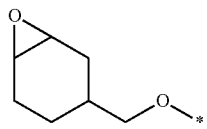
(P-11)

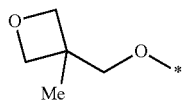
(P-12)

-continued

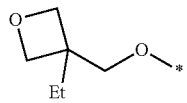
(P-13)

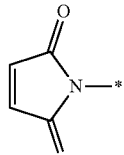
(P-14)

HS—*
(P-15)

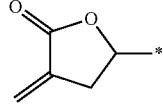
(P-16)

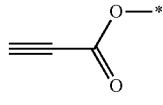
(P-17_)

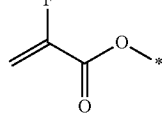
(P-18)

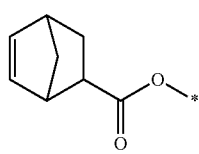
(P-19)

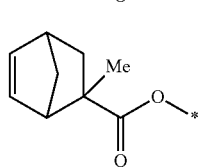
(P-20)

In Formula (I), any of $P^1$ and $P^2$ in Formula (I) is preferably a polymerizable group, and more preferably an acryloyloxy group or a methacryloyloxy group for a reason that the durability of a liquid crystal cured layer thus manufactured is improved.

On the other hand, in Formula (I), examples of the aromatic ring having 6 to 20 or more carbon atoms, shown in one aspect of Ar, include the same ones as those described in $G^1$ and $G^2$ in Formula (I).

In addition, in Formula (I), examples of the divalent alicyclic hydrocarbon group having 5 to 20 carbon atoms, shown in one aspect of Ar, include the same ones as those described in $G^1$ and $G^2$ in Formula (I).

Moreover, in Ar, examples of the substituent which may be contained in the aromatic ring having 6 to 20 carbon atoms or the divalent alicyclic hydrocarbon group having 5 to 20 carbon atoms include the same ones as those of the substituent which may be contained in each of $G^1$ and $G^2$ in Formula (I).

In the present invention, the liquid crystal compound is preferably a compound having any of aromatic rings selected from the group consisting of groups represented by Formulae (Ar-1) to (Ar-5), and more preferably the compound represented by Formula (I), in which Ar in Formula (I) represents any of aromatic rings selected from the group consisting of groups represented by Formulae (Ar-1) to (Ar-5), for a reason that the streak defects are further suppressed. Furthermore, in Formulae (Ar-1) to (Ar-5), * represents a bonding position, but in a case where Ar in Formula (I) represents any of aromatic rings selected from the group consisting of groups represented by Formulae (Ar-1) to (Ar-5), * represents a bonding position with $D^1$ or $D^2$.

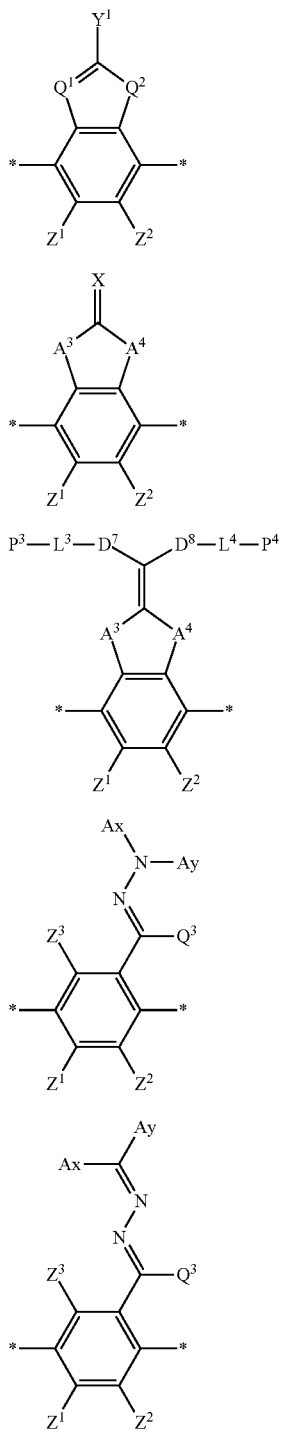

In Formula (Ar-1), $Q^1$ represents N or CH, $Q^2$ represents —S—, —O—, or —N($R^6$)—, $R^6$ represents a hydrogen atom or an alkyl group having 1 to 6 carbon atoms, and $Y^1$ represents an aromatic hydrocarbon group having 6 to 12 carbon atoms, which may have a substituent, an aromatic heterocyclic group having 3 to 12 carbon atoms, which may have a substituent, or an alicyclic hydrocarbon group having 6 to 20 carbon atoms, which may have a substituent, and one or more of —$CH_2$-'s constituting the alicyclic hydrocarbon group may be substituted with —O—, —S—, or —NH—.

Specific examples of the alkyl group having 1 to 6 carbon atoms, represented by $R^6$, include a methyl group, an ethyl group, a propyl group, an isopropyl group, an n-butyl group, an isobutyl group, a sec-butyl group, a tert-butyl group, an n-pentyl group, and an n-hexyl group.

Examples of the aromatic hydrocarbon group having 6 to 12 carbon atoms, represented by $Y^1$, include aryl groups such as a phenyl group, a 2,6-diethylphenyl group, and a naphthyl group.

Examples of the aromatic heterocyclic group having 3 to 12 carbon atoms, represented by $Y^1$, include heteroaryl groups such as a thienyl group, a thiazolyl group, a furyl group, and a pyridyl group.

Examples of the alicyclic hydrocarbon group having 6 to 20 carbon atoms, represented by $Y^1$, include a cyclohexylene group, a cyclopentylene group, a norbornylene group, and an adamantylene group.

In addition, examples of the substituent which may be contained in $Y^1$ include the same ones as those of the substituent which may be contained in each of $G^1$ and $G^2$ in Formula (I).

In addition, in Formulae (Ar-1) to (Ar-5), $Z^1$, $Z^2$, and $Z^3$ each independently represent a hydrogen atom, a monovalent aliphatic hydrocarbon group having 1 to 20 carbon atoms, a monovalent alicyclic hydrocarbon group having 3 to 20 carbon atoms, a monovalent aromatic hydrocarbon group having 6 to 20 carbon atoms, a monovalent aromatic heterocyclic group having 6 to 20 carbon atoms, a halogen atom, a cyano group, a nitro group, —$OR^7$, —$NR^8R^9$, —$SR^{10}$, —$COOR^{11}$, or —$COR^2$, where $R^1$ to $R^{12}$ each independently represent a hydrogen atom or an alkyl group having 1 to 6 carbon atoms, and $Z^1$ and $Z^2$ may be bonded to each other to form an aromatic ring.

As the monovalent aliphatic hydrocarbon group having 1 to 20 carbon atoms, an alkyl group having 1 to 15 carbon atoms is preferable, an alkyl group having 1 to 8 carbon atoms is more preferable, and specifically a methyl group, an ethyl group, an isopropyl group, a tert-pentyl group (1,1-dimethylpropyl group), a tert-butyl group, or a 1,1-dimethyl-3,3-dimethyl-butyl group is still more preferable, and the methyl group, the ethyl group, or the tert-butyl group is particularly preferable.

Examples of the monovalent alicyclic hydrocarbon group having 3 to 20 carbon atoms include monocyclic saturated hydrocarbon groups such as a cyclopropyl group, a cyclobutyl group, a cyclopentyl group, a cyclohexyl group, a cycloheptyl group, a cyclooctyl group, a cyclodecyl group, a methylcyclohexyl group, and an ethylcyclohexyl group; monocyclic unsaturated hydrocarbon groups such as a cyclobutenyl group, a cyclopentenyl group, a cyclohexenyl group, a cycloheptenyl group, a cyclooctenyl group, a cyclodecenyl group, a cyclopentadienyl group, a cyclohexadienyl group, a cyclooctadienyl group, and a cyclodecadiene; and polycyclic saturated hydrocarbon groups such as a bicyclo[2.2.1]heptyl group, a bicyclo[2.2.2]octyl group, a tricyclo[5.2.1.0$^{2,6}$]decyl group, a tricyclo[3.3.1.1$^{3,7}$]decyl group, a tetracyclo[6.2.1.1$^{3,6}$.0$^{2,7}$]dodecyl group, and an adamantyl group. Specific examples of the monovalent aromatic hydrocarbon group having 6 to 20 carbon atoms include a phenyl group, a 2,6-diethylphenyl group, a naphthyl group, and a biphenyl group, and an aryl group having 6 to 12 carbon atoms (particularly a phenyl group) is preferable.

Specific examples of the monovalent aromatic heterocyclic group having 6 to 20 carbon atoms include a 4-pyridyl group, a 2-furyl group, a 2-thienyl group, a 2-pyrimidinyl group, and a 2-benzothiazolyl group.

Examples of the halogen atom include a fluorine atom, a chlorine atom, a bromine atom, and an iodine atom, and among these, the fluorine atom, the chlorine atom, or the bromine atom is preferable.

On the other hand, specific examples of the alkyl group having 1 to 6 carbon atoms, represented by each of $R^7$ to $R^{10}$, include a methyl group, an ethyl group, a propyl group, an isopropyl group, an n-butyl group, an isobutyl group, a sec-butyl group, a tert-butyl group, an n-pentyl group, and an n-hexyl group.

As described above, $Z^1$ and $Z^2$ may be bonded to each other to form an aromatic ring, and examples of the structure in a case where $Z^1$ and $Z^2$ in Formula (Ar-1) are bonded to each other to form an aromatic ring include a group represented by Formula (Ar-1a). Furthermore, in Formula (Ar-1a), * represents a bonding position to $D^1$ or $D^2$ in Formula (I).

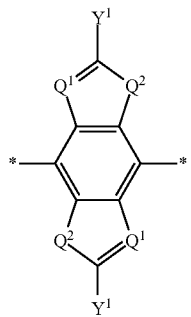

(Ar-1a)

Here, in Formula (Ar-1a), examples of $Q^1$, $Q^2$, and $Y^1$ include the same ones as those described in Formula (Ar-1).

In addition, in Formulae (Ar-2) and (Ar-3), $A^3$ and $A^4$ each independently represent a group selected from the group consisting of —O—, —N($R^3$)—, —S—, and —CO—, where $R^3$ represents a hydrogen atom or a substituent.

Examples of the substituent represented by $R^{13}$ include the same ones as those of the substituent which may be contained in each of $G^1$ and $G^2$ in Formula (I).

In addition, in Formula (Ar-2), X represents a hydrogen atom or a non-metal atom of Groups XIV to XVI, to which a substituent may be bonded.

Furthermore, examples of the non-metal atom of Groups XIV to XVI represented by X include an oxygen atom, a sulfur atom, a nitrogen atom to which a hydrogen atom or a substituent is bonded [=N—$R^{N1}$, $R^{N1}$ represents a hydrogen atom or a substituent], and a carbon atom to which a hydrogen atom or a substituent is bonded [=C—$(R^{C1})_2$, $R^{C1}$ represents a hydrogen atom or a substituent].

Examples of the substituent include an alkyl group, an alkoxy group, an alkyl-substituted alkoxy group, a cyclic alkyl group, an aryl group (for example, a phenyl group and a naphthyl group), a cyano group, an amino group, a nitro group, an alkylcarbonyl group, a sulfo group, and a hydroxyl group.

In addition, in Formula (Ar-3), $D^7$ and $D^8$ each independently represent a single bond, or —CO—, —O—, —S—, —C(=S)—, —$CR^1R^2$—, —$CR^3$=$CR^4$—, —$NR^5$—, or a divalent linking group consisting of a combination of two or more of these groups, where $R^1$ to $R^5$ each independently represent a hydrogen atom, a fluorine atom, or an alkyl group having 1 to 12 carbon atoms.

Here, specific examples of the divalent linking group include the same ones as those described in $D^1$, $D^2$, $D^3$, $D^4$, $D^5$, and $D^6$ in Formula (I).

In addition, in Formula (Ar-3), $L^3$ and $L^4$ each independently represent a single bond, a linear or branched alkylene group having 1 to 14 carbon atoms, or a divalent linking group in which one or more of —$CH_2$-'s constituting the linear or branched alkylene group having 1 to 14 carbon atoms are substituted with —O—, —S—, —NH—, —N(Q)-, or —CO—, where Q represents a substituent. Examples of the substituent include the same ones as those of the substituent which may be contained in each of $G^1$ and $G^2$ in Formula (I).

Here, examples of the alkylene group include the same ones as those described in $L^1$ and $L^2$ in Formula (I).

In addition, in Formula (Ar-3), $P^3$ and $P^4$ each independently represent a monovalent organic group, and at least one of $P^3$ or $P^4$ represents a polymerizable group.

Examples of the monovalent organic group include the same ones as those described in $P^1$ and $P^2$ in Formula (I).

In addition, examples of the polymerizable group include the same ones as those of the polymerizable groups described for $P^1$ and $P^2$ in Formula (I).

Moreover, in Formulae (Ar-4) and (Ar-5), Ax represents an organic group having 2 to 30 carbon atoms, which has at least one aromatic ring selected from the group consisting of an aromatic hydrocarbon ring and an aromatic heterocyclic ring.

In addition, in Formulae (Ar-4) and (Ar-5), Ay represents a hydrogen atom, an alkyl group having 1 to 12 carbon atoms, which may have a substituent, or an organic group having 2 to 30 carbon atoms, which has at least one aromatic ring selected from the group consisting of an aromatic hydrocarbon ring and an aromatic heterocyclic ring.

Here, the aromatic ring in each of Ax and Ay may have a substituent, and Ax and Ay may be bonded to each other to form a ring.

In addition, $Q^3$ represents a hydrogen atom or an alkyl group having 1 to 6 carbon atoms, which may have a substituent.

Examples of each of Ax and Ay include the ones described in paragraphs [0039] to [0095] of WO2014/010325A.

In addition, specific examples of the alkyl group having 1 to 20 carbon atoms, represented by $Q^3$, include a methyl group, an ethyl group, a propyl group, an isopropyl group, an n-butyl group, an isobutyl group, a sec-butyl group, a tert-butyl group, an n-pentyl group, and an n-hexyl group, and examples of the substituent include the same ones as those of the substituent which may be contained in each of $G^1$ and $G^2$ in Formula (I).

Examples of the compound represented by Formula (I) include the polymerizable compounds described in paragraphs [0019] to [0023] of JP2019-139222A; the polymerizable compounds described in paragraphs [0059] to [0061] of WO2019/160014A; the polymerizable compounds described in paragraph [0055] of WO2019/160016A; the compounds (1-1) to (1-19) represented by the following formulae; and compounds (2-1) to (2-5) represented by the following formulae. Moreover, a group adjacent to the acryloyloxy group in the structure of the compound (1-14) represents a propylene group (a group obtained by substituting a methyl group with an ethylene group), and the compound (1-14) represents a mixture of regioisomers in which the positions of the methyl groups are different.

(I-1) 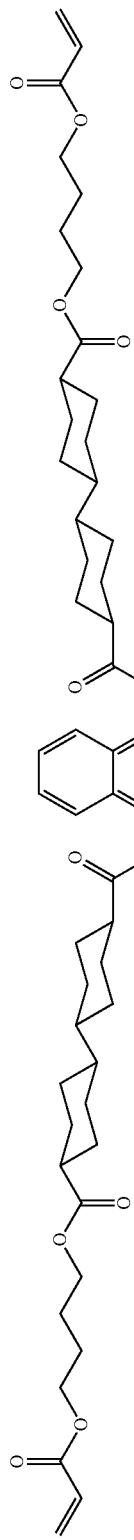
(I-2) 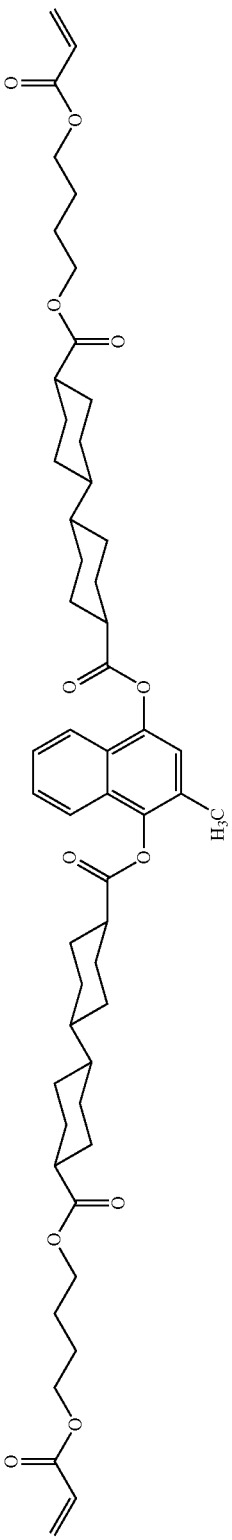
(I-3) 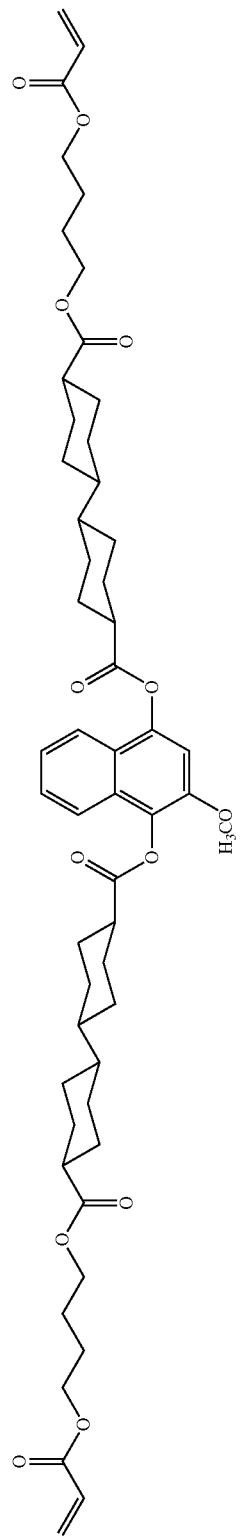
(I-4) 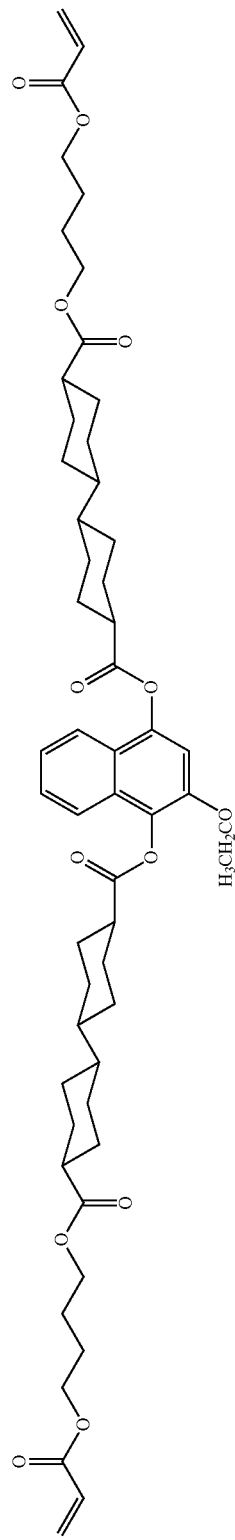

-continued
(1-5)
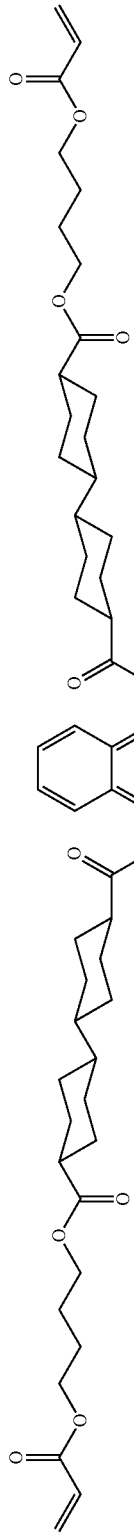
(1-6)
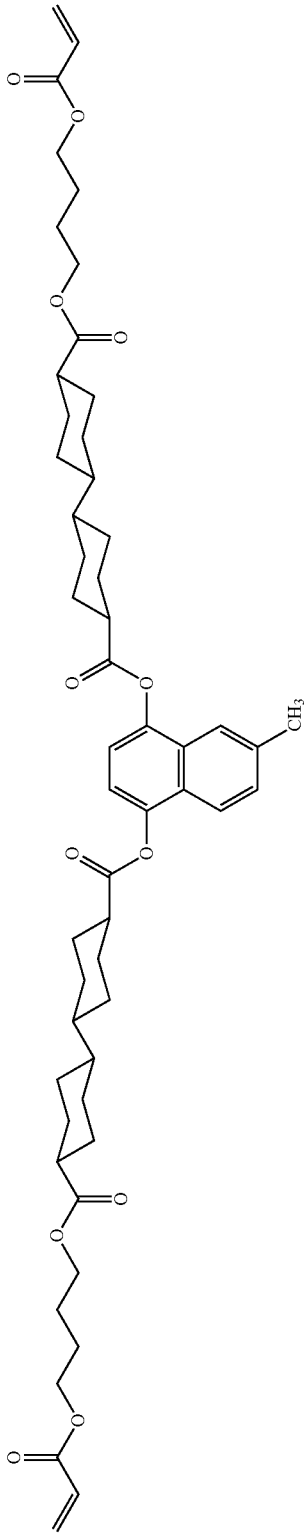
(1-7)
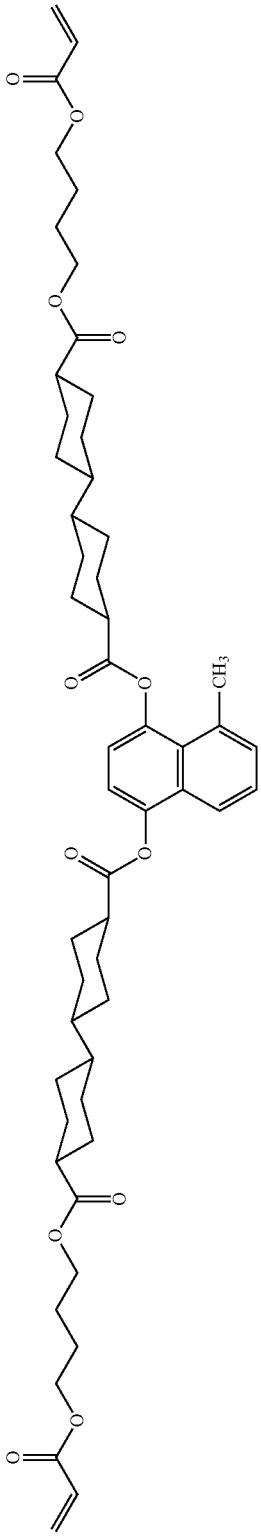
(1-8)
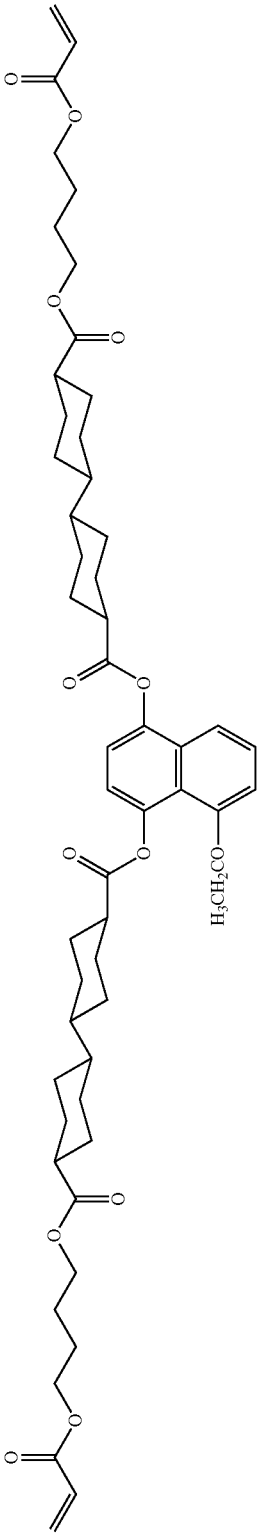

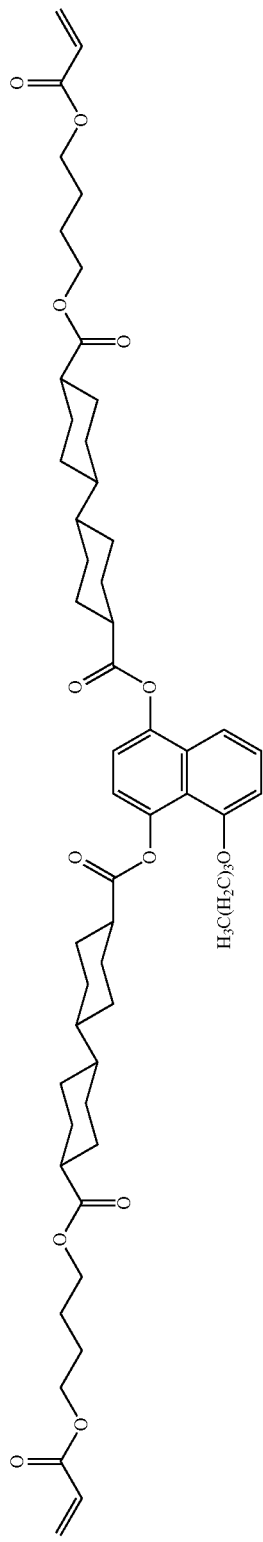
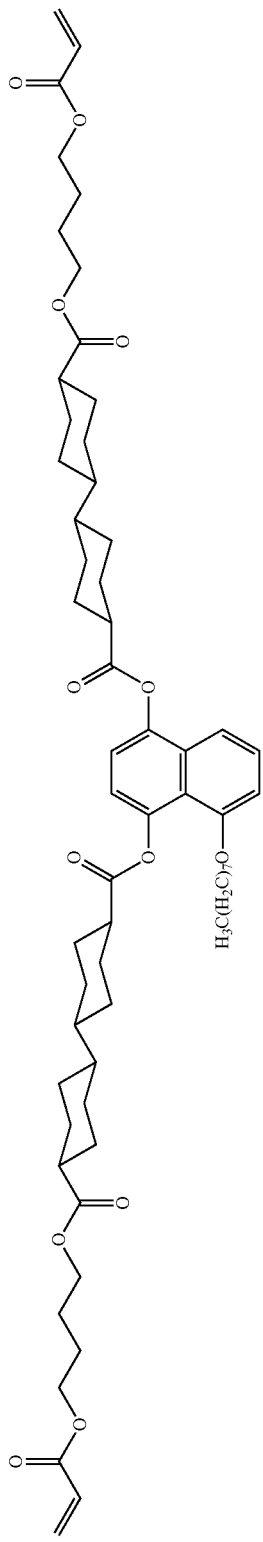
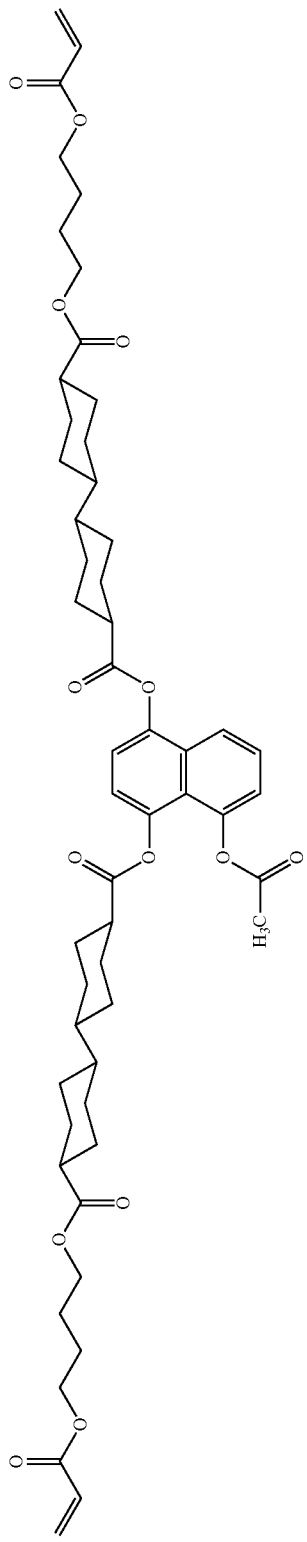

(1-12)
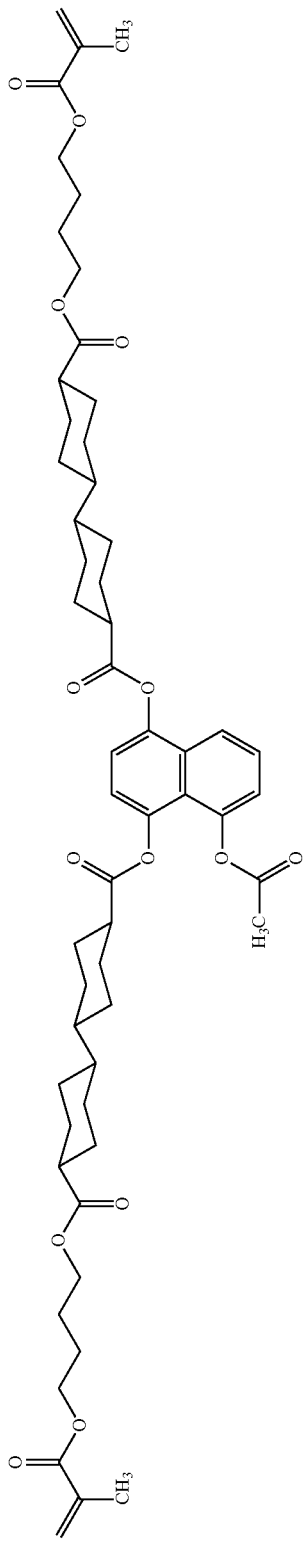
(1-13)
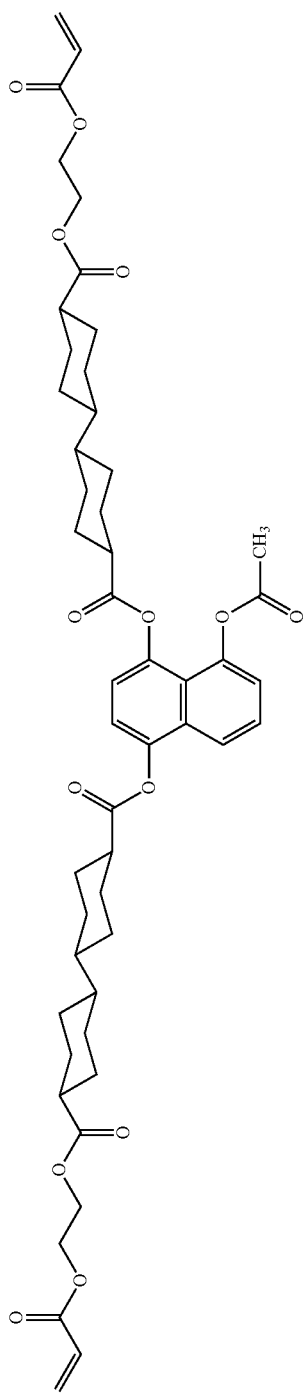
(1-14)
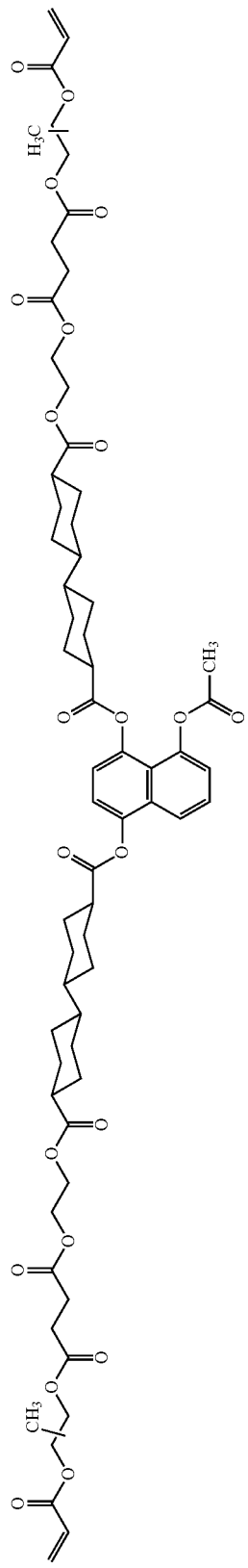

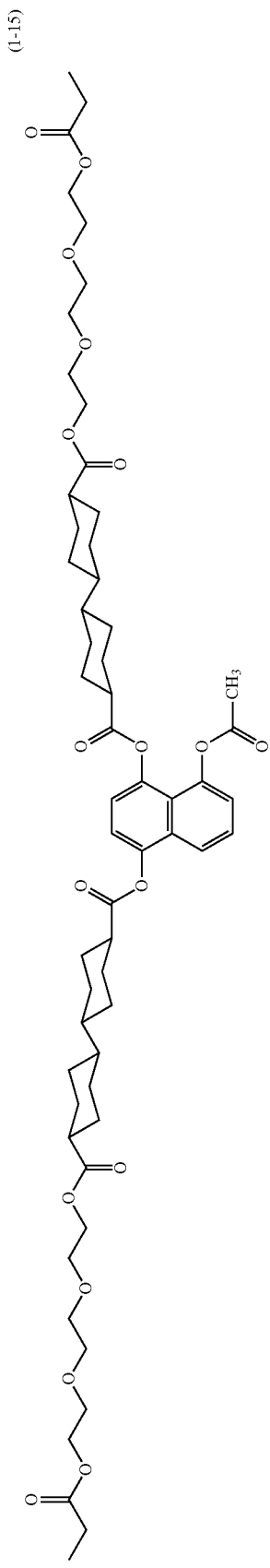
(1-15)
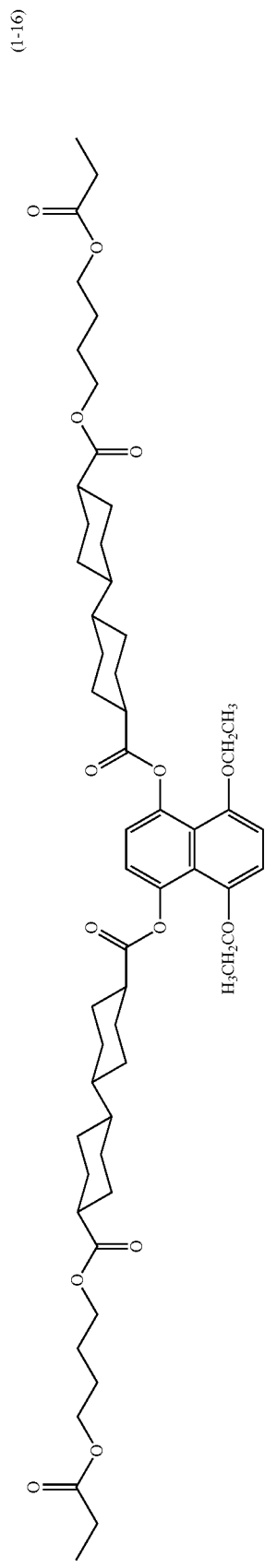
(1-16)
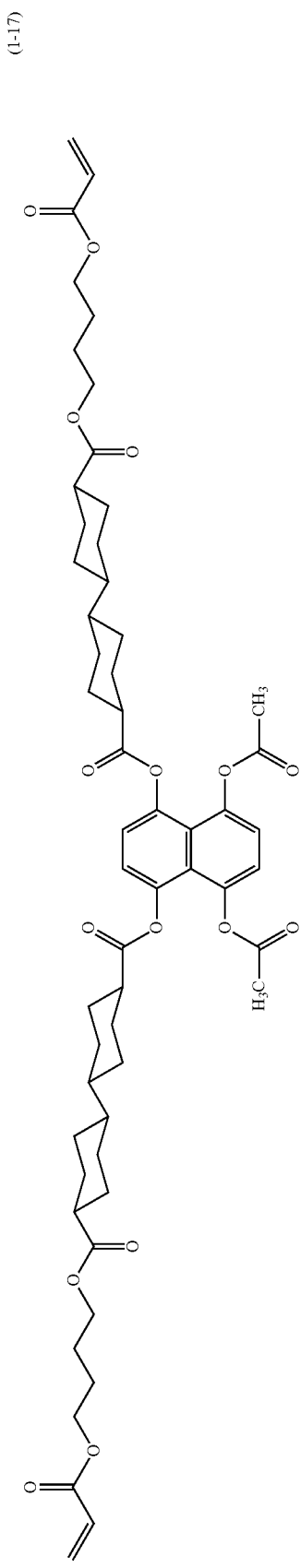
(1-17)

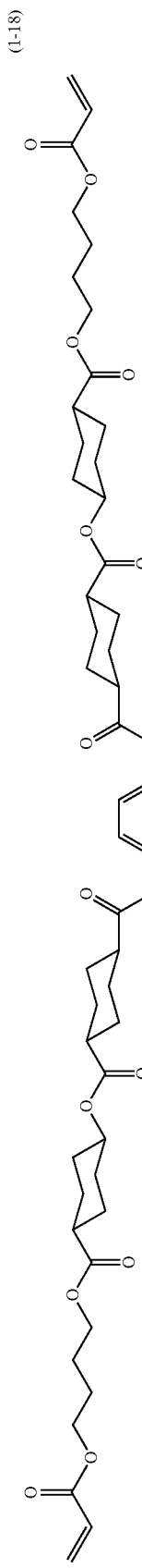
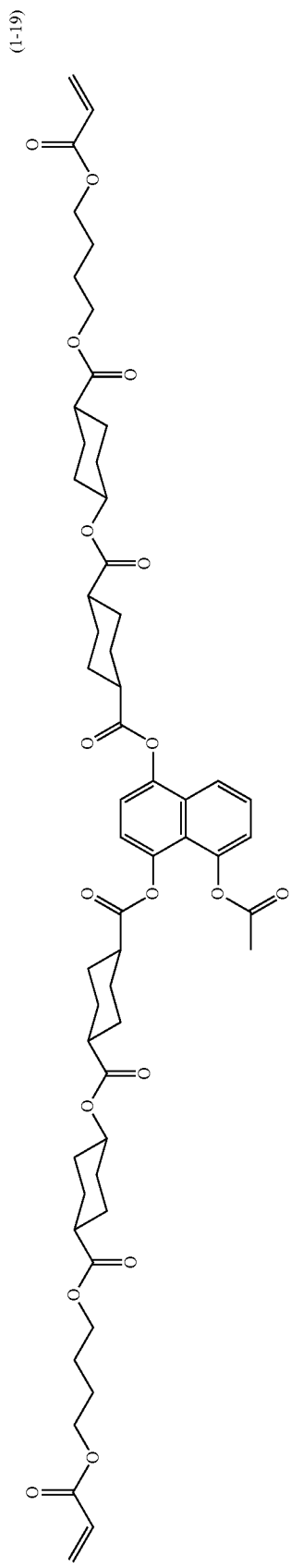
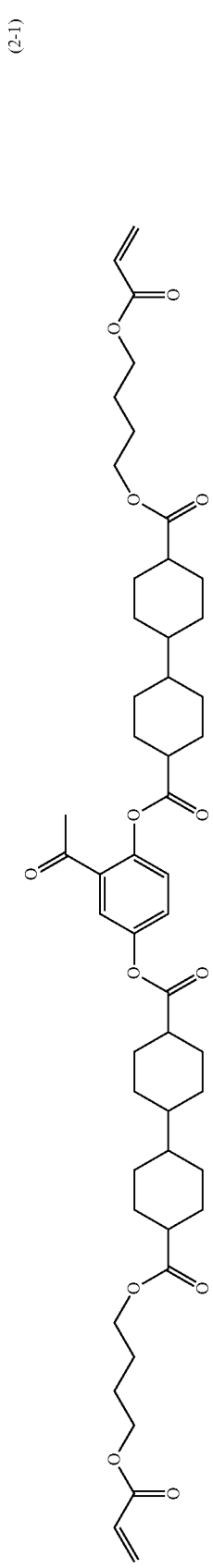
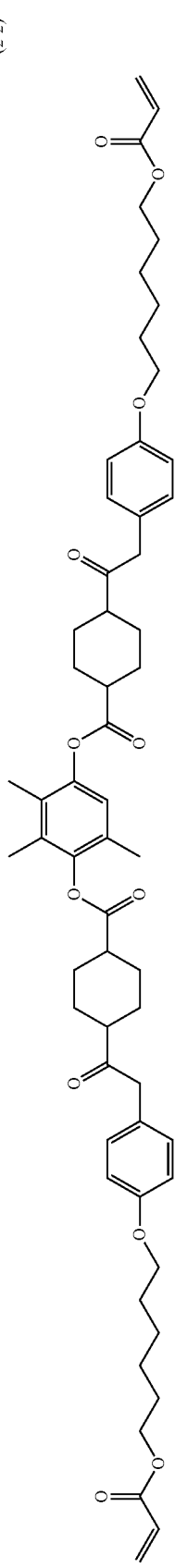

-continued
(2-3)
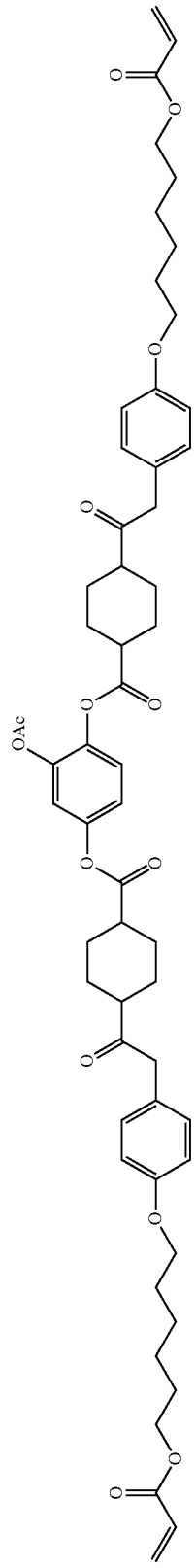
(2-4)
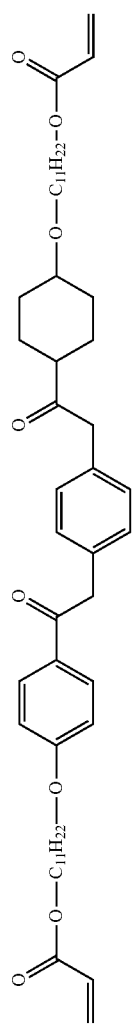
(2-5)
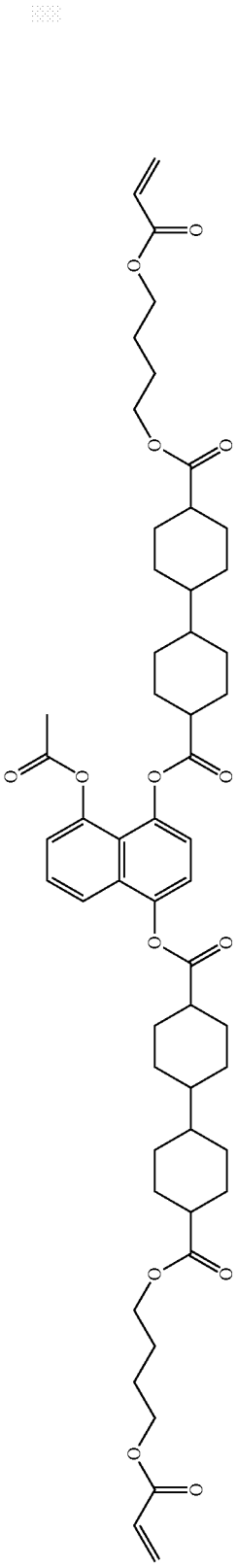

In addition, examples of the compound represented by Formula (I) include the compounds exhibiting smectic properties among the compounds represented by General Formula (I) described in JP2010-084032A (in particular, the compounds described in paragraph Nos. [0067] to [0073]), the compound represented by General Formula (II) described in JP2016-053709A (in particular, the compounds described in paragraph Nos. [0036] to [0043]), and the compounds represented by General Formula (I) described in JP2016-081035A (in particular, the compounds described in paragraph Nos. [0043] to [0055]).

Furthermore, suitable examples of the compound represented by Formula (I) include any of the compounds that exhibit smectic properties among the compounds represented by Formulae (1) to (22), and specifically include compounds having side chain structures shown in Tables 1 to 3 below as K (side chain structure) in Formulae (1) to (22).

Furthermore, in Tables 1 to 3 below, "*" shown in the side chain structure of K represents a bonding position to an aromatic ring.

In addition, in the side chain structures shown in 2-2 in Table 2 below and 3-2 in Table 3 below, a group adjacent to each of the acryloyloxy group and the methacryloyl group represents a propylene group (a group in which a methyl group is substituted with an ethylene group), and represents a mixture of regioisomers in which the positions of the methyl groups are different.

(1)

(2)

(3)

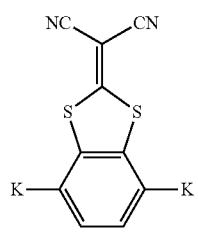
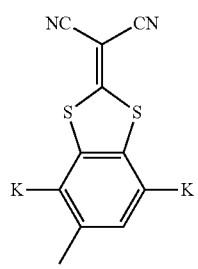
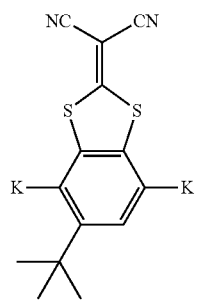

-continued (4)

(5)

(6)

(7)

(8)

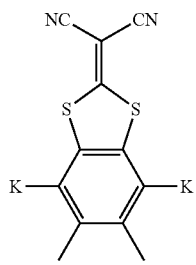
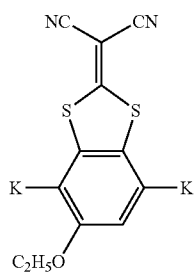
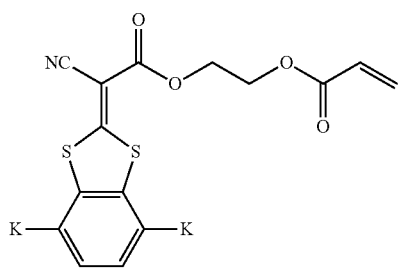
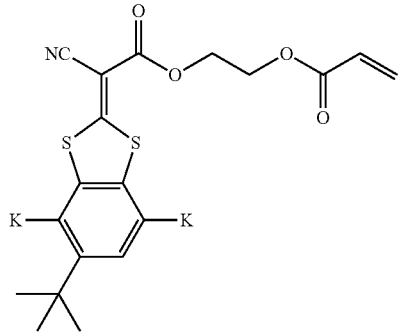
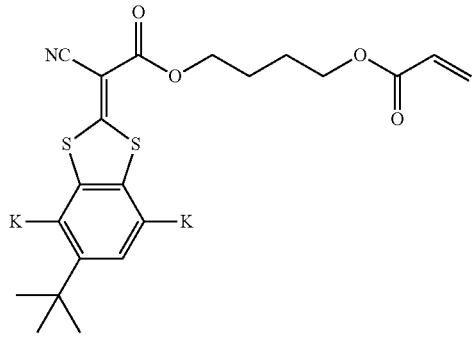

(9)
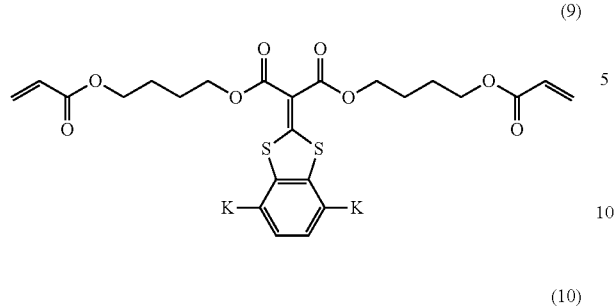
(10)
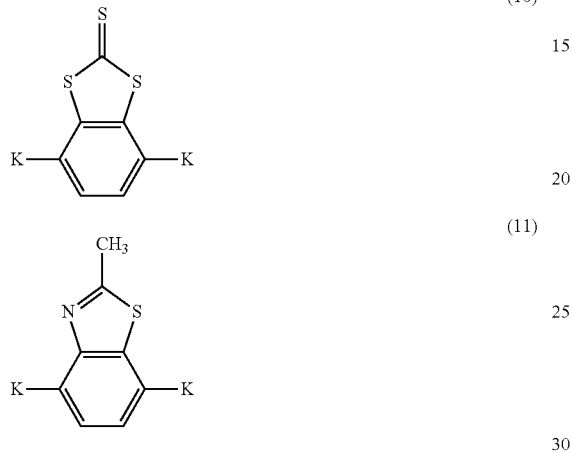
(11)
(12)
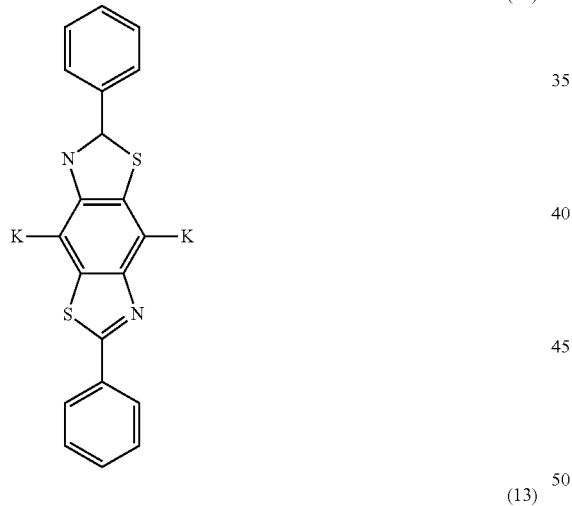
(13)
(14)
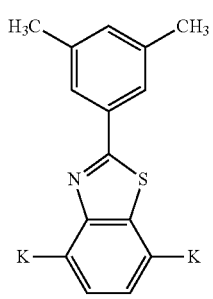
(15)
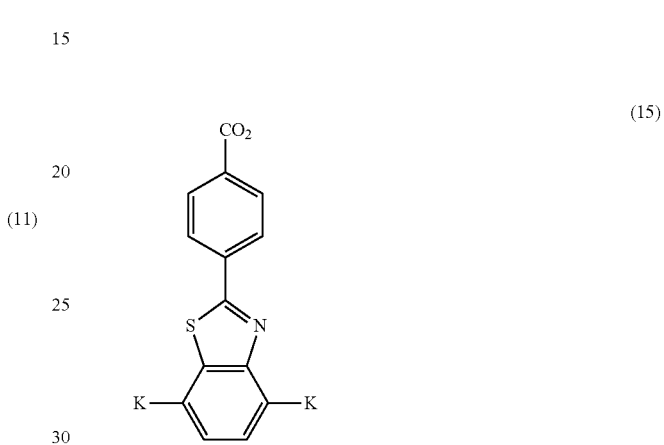
(16)
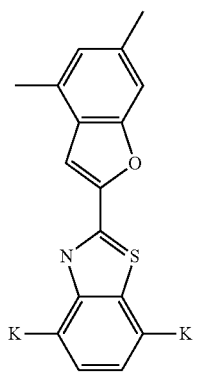
(17)
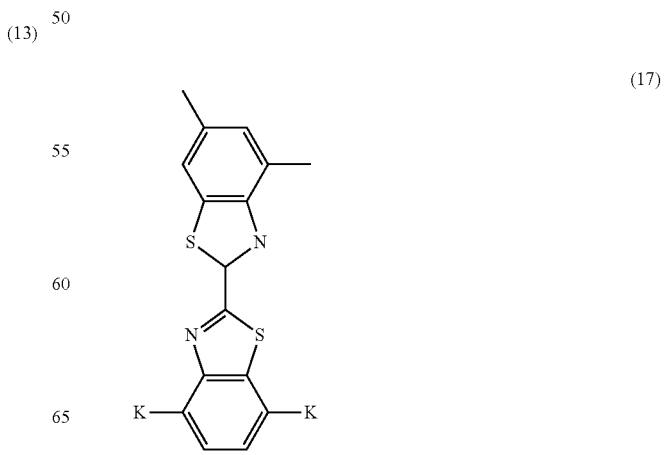

(18)
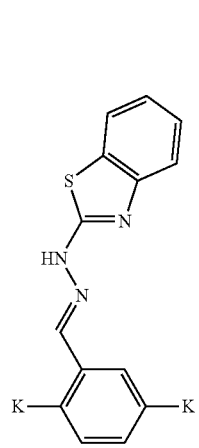
(19)
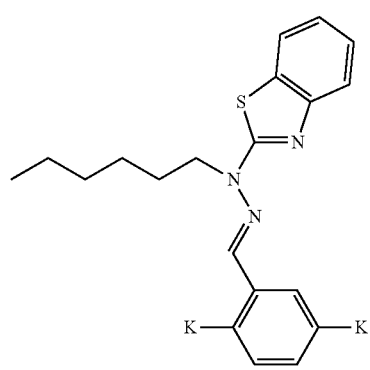
(20)
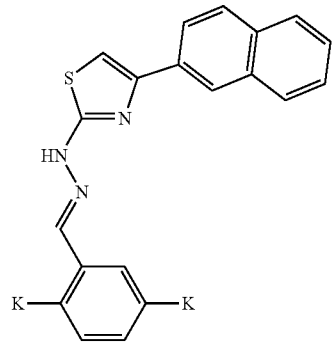
(21)
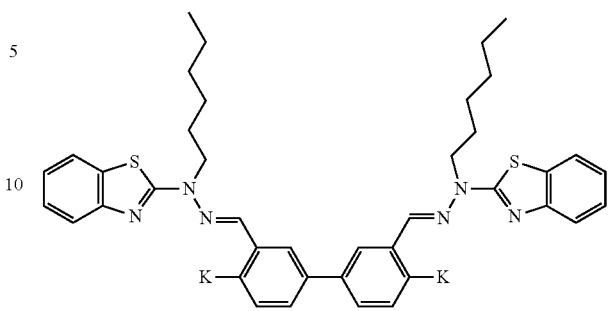
(22)
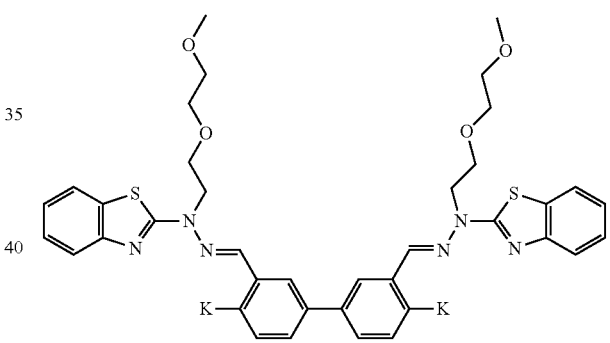
TABLE 1
| | K (side chain structure) |
|---|---|
| 1-1 | 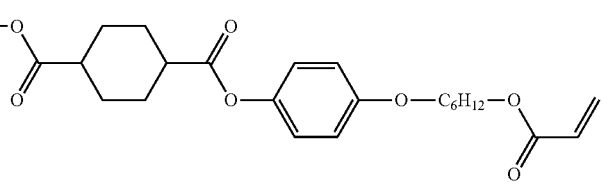 |
| 1-2 | 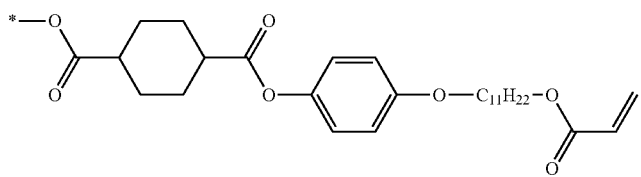 |

TABLE 1-continued

| | K (side chain structure) |
|---|---|
| 1-3 | (chemical structure) |
| 1-4 | (chemical structure) |
| 1-5 | (chemical structure) |
| 1-6 | (chemical structure) |

TABLE 2

| | K (side chain structure) |
|---|---|
| 2-1 | (chemical structure) |
| 2-2 | (chemical structure) |
| 2-3 | (chemical structure) |
| 2-4 | (chemical structure) |
| 2-5 | (chemical structure) |
| 2-6 | (chemical structure) |

TABLE 2-continued

| | K (side chain structure) |
|---|---|
| 2-7 | |
| 2-8 | |
| 2-9 | |
| 2-10 | |
| 2-11 | |
| 2-12 | |
| 2-13 | |
| 2-14 | |

TABLE 3

| | K (side chain structure) |
|---|---|
| 3-1 | |
| 3-2 | |

TABLE 3-continued

| | K (side chain structure) |
|---|---|
| 3-3 | |
| 3-4 | |
| 3-5 | |
| 3-6 | |
| 3-7 | |
| 3-8 | |
| 3-9 | |
| 3-10 | |
| 3-11 | |
| 3-12 | |
| 3-13 | |

TABLE 3-continued

K (side chain structure)

3-14 

Basic Compound

The basic compound contained in the liquid crystal composition of the embodiment of the present invention is a compound whose conjugate acid has a pKa of 4 to 10 (that is, a basic compound to which H⁺ is donated by an acid).

Here, the acid dissociation constant (pKa) refers to a pKa in an aqueous solution, and is defined in Chemical Handbook (II) (Revised 4th Edition, 1993, compiled by the Chemical Society of Japan, Maruzen Company, Ltd.). A lower value of the pKa indicates higher acid strength. Specifically, the pKa in an aqueous solution can be actually measured by using an infinite-dilution aqueous solution and measuring the acid dissociation constant at 25° C. Alternatively, the pKa can also be determined using the following software package 1 by computation from a value based on a Hammett's substituent constant and the database of publicly known literature values. Any of the pKa values described in the present specification indicates values determined by computation using the software package.

Software Package 1: Advanced Chemistry Development (ACD/Labs) Software V 8.14 for Solaris (1994-2007 ACD/Labs).

In the present invention, the pKa of the conjugate acid of the basic compound is preferably 4.5 to 9.5, more preferably 5.0 to 9.2, still more preferably 6.0 to 9.0, and particularly preferably 6.5 to 9.0 for a reason that the streak defects are further suppressed and the temporal stability is improved.

In addition, in the present invention, the molecular weight of the basic compound is preferably 500 or less, more preferably 40 to 400, still more preferably 50 to 300, and particularly preferably 60 to 200 for a reason that the streak defects are further suppressed.

In the present invention, the basic compound is preferably a heterocyclic amine compound, and more preferably an aromatic heterocyclic amine compound for a reason that the temporal stability is improved.

Specific examples of the aromatic heterocyclic amine compound among the basic compounds include compounds shown below.

| Structure | pKa of conjugate acid |
|---|---|
| 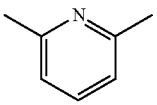 | 7.0 |
| 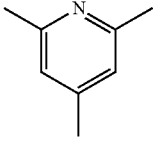 | 7.6 |
| 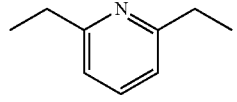 | 5.7 |

-continued

| Structure | pKa of conjugate acid |
|---|---|
| 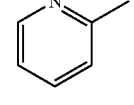 | 7.0 |
| 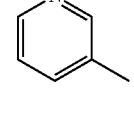 | 7.4 |
| 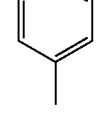 | 6.6 |
| 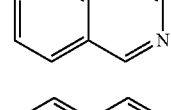 | 6.1 |
| 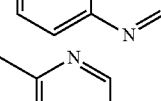 | 5.8 |
| 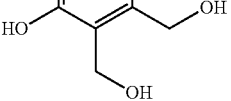 | 6.1 |
| | 5.1 |
| | 4.9 |
| | 9.1 |

Examples of the heterocyclic amine compound not corresponding to the aromatic heterocyclic amine compound among the basic compounds include compounds shown below.

| Structure | pKa of conjugate acid |
|---|---|
| piperazine | 9.8 |
| 1,4-dimethylpiperazine | 8.5 |
| quinuclidine | 4.2 |
| morpholine | 8.3 |
| N-methylmorpholine | 7.8 |
| 1-methyl-4-piperidone | 8.0 |
| tropinone | 8.9 |

Specific examples of those not corresponding to the heterocyclic amine compound among the basic compounds include compounds shown below.

| Structure | pKa of conjugate acid |
|---|---|
| aniline | 4.6 |
| N-methylaniline | 5.1 |
| furfurylamine | 8.9 |

In the present invention, a content of the basic compound is preferably 0.01 to 5 parts by mass, more preferably 0.010 to 5.000 parts by mass, still more preferably 0.03 to 5 parts by mass, particularly preferably 0.05 to 4 parts by mass, and most preferably 0.08 to 2 parts by mass with respect to 100 parts by mass of the above-mentioned liquid crystal compound for a reason that the streak defects are further suppressed and the temporal stability is improved.

In the present invention, the content of the basic compound preferably satisfies Expression (i) for a reason that the streak defects are further suppressed and the temporal stability is improved.

$$1.0 \times 10^{-10} < a \times 10^{-(14-pKa)} < 1.0 \times 10^{-6} \qquad (i)$$

Here, in Expression (i), a represents a content of the basic compound and represents an amount in parts by mass with respect to 100 parts by mass of the liquid crystal compound. In addition, pKa represents an acid dissociation constant of the conjugate acid of the basic compound.

Moreover, considering that "$10^{-(14-pKa)}$" to be multiplied by the content a of the basic compound is a logarithmic value in which a pKb (base dissociation constant) is represented by "14-pKa", the pKa is a value intended for a basic concentration coefficient.

Therefore, "$a \times 10^{-(14-pKa)}$" in Expression (i) is a value intended for the basic concentration.

Polymerization Initiator

The liquid crystal composition of the embodiment of the present invention preferably includes a polymerization initiator.

As the polymerization initiator, a photopolymerization initiator capable of initiating a polymerization reaction upon irradiation with ultraviolet rays is preferable.

Examples of the photopolymerization initiator include α-carbonyl compounds (described in each of the specifications of U.S. Pat. Nos. 2,367,661A and 2,367,670A), acyloin ethers (described in the specification of U.S. Pat. No. 2,448,828A), α-hydrocarbon-substituted aromatic acyloin compounds (described in the specification of U.S. Pat. No. 2,722,512A), multinuclear quinone compounds (described in each of the specifications of U.S. Pat. Nos. 3,046,127A and 2,951,758A), combinations of a triarylimidazole dimer and a p-aminophenyl ketone (described in the specification of U.S. Pat. No. 3,549,367A), acridine and phenazine compounds (described in JP1985-105667A (JP-S60-105667A) and the specification of U.S. Pat. No. 4,239,850A), oxadiazole compounds (described in the specification of U.S. Pat. No. 4,212,970A), and acyl phosphine oxide compounds (described in JP1988-40799B (JP-S63-40799B), JP1993-29234B (JP-H05-29234B), JP1998-95788A (JP-H10-95788A), and JP1998-29997A (JP-H10-29997A)).

As the polymerization initiator, an oxime-type polymerization initiator is also preferable. Specific examples thereof include the initiators described in paragraphs [0049] to [0052] of WO2017/170443A.

Dichroic Substance

The liquid crystal composition of the embodiment of the present invention may contain a dichroic substance from the viewpoint of using a liquid crystal cured layer which will be described later as a polarizer (light absorption anisotropic film).

In the present invention, the dichroic substance means a coloring agent having an absorbance that varies depending on a direction. The dichroic substance may or may not exhibit liquid crystallinity.

The dichroic substance is not particularly limited, and is a visible light absorbing substance (dichroic coloring agent), a luminescent substance (a fluorescent substance, a phosphorescent substance), an ultraviolet absorbing substance, an infrared absorbing substance, a nonlinear optical substance, a carbon nanotube, and an inorganic substance (for example, a quantum rod), and dichroic substances (dichroic coloring agents) known in the related art can be used.

Specific examples thereof include those described in paragraphs [0067] to [0071] of JP2013-228706A, paragraphs [0008] to [0026] of JP2013-227532A, paragraphs [0008] to [0015] of JP2013-209367A, paragraphs [0045] to [0058] of JP2013-14883A, paragraphs [0012] to [0029] of JP2013-109090A, paragraphs [0009] to [0017] of JP2013-101328A, paragraphs [0051] to [0065] of JP2013-37353A, paragraphs [0049] to [0073] of JP2012-63387A, paragraphs [0016] to [0018] of JP1999-305036A (JP-H11-305036A), paragraphs [0009] to [0011] of JP2001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0005] to [0051] of JP2016-006502A, paragraphs [0014] to [0032] of JP2018-053167A, paragraphs [0014] to [0033] of JP 2020-11716A, paragraphs [0005] to [0041] of WO2016/060173A, paragraphs [0008] to [0062] of WO2016/136561A, paragraphs [0014] to [0033] of WO2017/154835A, paragraphs [0014] to [0033] of WO2017/154695A, paragraphs [0013] to [0037] of WO2017/195833A, paragraphs [0014] to [0034] of WO2018/164252A, paragraphs [0021] to [0030] of WO2018/186503A, paragraphs [0043] to [0063] of WO2019/189345A, paragraphs [0043] to [0085] of WO2019/225468A, paragraphs [0050] to [0074] of WO2020/004106A, paragraphs [0015] to [0038] of WO2021/044843A, and the like.

In the present invention, two or more kinds of dichroic substances may be used in combination, and for example, from the viewpoint of bringing a polarizer (light absorption anisotropic film) as a liquid crystal cured layer which will be described later into black, it is preferable to use at least one dichroic substance having a maximum absorption wavelength in the wavelength range of 370 nm or more and less than 550 nm and at least one dichroic substance having a maximum absorption wavelength in the wavelength range of 500 nm or more and less than 700 nm in combination.

The dichroic substance may have a crosslinkable group.

Specific examples of the crosslinkable group include a (meth)acryloyl group, an epoxy group, an oxetanyl group, and a styryl group, and among these, the (meth)acryloyl group is preferable.

In a case where the liquid crystal composition of the embodiment of the present invention contains a dichroic substance, the content of the dichroic substance is preferably 1 to 400 parts by mass, more preferably 2 to 100 parts by mass, and still more preferably 5 to 30 parts by mass with respect to 100 parts by mass of the liquid crystal compound. In addition, the content of the dichroic substance is preferably 1% to 50% by mass, and more preferably 2% to 40% by mass in the solid content of the liquid crystal composition.

Solvent

It is preferable that the liquid crystal composition of the embodiment of the present invention includes a solvent from the viewpoint of workability in a case where a liquid crystal cured layer is formed.

Examples of the solvent include ketones (for example, acetone, 2-butanone, methyl isobutyl ketone, cyclohexanone, and cyclopentanone), ethers (for example, dioxane and tetrahydrofuran), aliphatic hydrocarbons (for example, hexane), alicyclic hydrocarbons (for example, cyclohexane), aromatic hydrocarbons (for example, toluene, xylene, and trimethylbenzene), halogenated carbons (for example, dichloromethane, dichloroethane, dichlorobenzene, and chlorotoluene), esters (for example, methyl acetate, ethyl acetate, and butyl acetate), water, alcohols (for example, ethanol, isopropanol, butanol, and cyclohexanol), cellosolves (for example, methyl cellosolve and ethyl cellosolve), cellosolve acetates, sulfoxides (for example, dimethyl sulfoxide), and amides (for example, dimethylformamide and dimethylacetamide). The solvents may be used singly or in combination of two or more kinds thereof.

Leveling Agent

It is preferable that the liquid crystal composition of the embodiment of the present invention includes a leveling agent from the viewpoint that a surface of a liquid crystal cured layer is maintained smooth and the alignment is easily controlled.

Such a leveling agent is preferably a fluorine-based leveling agent or a silicon-based leveling agent for a reason that it has a high leveling effect on the addition amount, and the leveling agent is more preferably a fluorine-based leveling agent from the viewpoint that it is less likely to cause bleeding (bloom or bleed).

Examples of the leveling agent include the compounds described in paragraphs [0079] to [0102] of JP2007-069471A, the compound represented by General Formula (I) described in JP2013-047204A (in particular, the compounds described in paragraphs [0020] to [0032]), the compound represented by General Formula (I) described in JP2012-211306A (in particular, the compounds described in paragraphs [0022] to [0029]), the liquid crystal alignment accelerator represented by General Formula (I) described in JP2002-129162A (in particular, the compounds described in paragraphs [0076] to [0078] and [0082] to [0084]), and the compounds represented by General Formulae (I), (II), and (III) described in JP2005-099248A (in particular, the compounds described in paragraphs [0092] to [0096]). Furthermore, the leveling agent may also function as an alignment control agent which will be described later.

Alignment Control Agent

The liquid crystal composition of the embodiment of the present invention may include an alignment control agent as necessary.

With the alignment control agent, various alignment states such as homeotropic alignment (vertical alignment), tilt alignment, hybrid alignment, and cholesteric alignment can be formed, in addition to the homogeneous alignment, and specific alignment states can be controlled and realized more uniformly and more accurately.

As an alignment control agent which accelerates the homogeneous alignment, for example, a low-molecular-weight alignment control agent and a high-molecular-weight alignment control agent can be used.

With regard to the low-molecular-weight alignment control agent, reference can be made to the description in, for example, paragraphs [0009] to [0083] of JP2002-20363A, paragraphs [0111] to [0120] of JP2006-106662A, and paragraphs [0021] to [0029] of JP2012-211306A, the contents of which are hereby incorporated by reference.

In addition, with regard to the high-molecular-weight alignment control agent, reference can be made to the description in, for example, paragraphs [0021] to [0057] of JP2004-198511A and paragraphs [0121] to [0167] of JP2006-106662A, the contents of which are hereby incorporated by reference.

Moreover, examples of an alignment control agent which forms or accelerates a homeotropic alignment include a boronic acid compound and an onium salt compound. With regard to the alignment control agent, reference can be made to the description in the compounds described in paragraphs [0023] to [0032] of JP2008-225281A, paragraphs [0052] to [0058] of JP2012-208397A, paragraphs [0024] to [0055] of JP2008-026730A, and paragraphs [0043] to [0055] of JP2016-193869A, the contents of which are hereby incorporated by reference.

On the other hand, the cholesteric alignment can be realized by adding a chiral agent to the liquid crystal composition of the embodiment of the present invention, and it is possible to control the direction of revolution of the cholesteric alignment by its chiral direction.

Incidentally, the pitch of the cholesteric alignment in accordance with the alignment restricting force of the chiral agent may be controlled.

In a case where the liquid crystal composition of the embodiment of the present invention includes an alignment control agent, a content thereof is preferably 0.01% to 10% by mass, and more preferably 0.05% to 5% by mass with respect to the mass of the total solid content of the composition. In a case where the content is within the range, it is possible to obtain a uniform and highly transparent cured product, in which precipitation, phase separation, alignment defects, and the like are suppressed while a desired alignment state is achieved.

Other Components

The liquid crystal composition of the embodiment of the present invention may include components other than the above-mentioned components. Examples of such other components include a liquid crystal compound (for example, the liquid crystal compound satisfying Expression (1)) other than the above-mentioned liquid crystal compound, a surfactant, a tilt angle control agent, an alignment aid, a plasticizer, and a crosslinking agent.

Liquid Crystal Cured Layer

The liquid crystal cured layer of an embodiment of the present invention is a liquid crystal cured layer obtained by immobilizing the alignment state of the above-mentioned liquid crystal composition of the embodiment of the present invention.

Examples of a method for forming the liquid crystal cured layer include a method in which the above-mentioned liquid crystal composition of the embodiment of the present invention is used to cause a desired alignment state, which is then immobilized by polymerization.

Here, the polymerization conditions are not particularly limited, but in the polymerization by irradiation with light, ultraviolet rays are preferably used. The irradiation dose is preferably 10 mJ/cm$^2$ to 50 J/cm$^2$, more preferably 20 mJ/cm$^2$ to 5 J/cm$^2$, still more preferably 30 mJ/cm$^2$ to 3 J/cm$^2$, and particularly preferably 50 to 1,000 mJ/cm$^2$. In addition, the polymerization may be carried out under a heating condition in order to accelerate the polymerization reaction.

In addition, the liquid crystal cured layer can be formed on any of supports or alignment films in the optical film which will be described later or a polarizer in the polarizing plate which will be described later.

The alignment state of the liquid crystal compound in the liquid crystal cured layer of the embodiment of the present invention may be any of horizontal alignment, vertical alignment, tilt alignment, and twist alignment, and it is preferable that the liquid crystal compound is immobilized in a state of being horizontally aligned with respect to the main surface of the liquid crystal cured layer.

In addition, in the present specification, the "horizontal alignment" means that the main surface of a liquid crystal cured layer (or in a case where the liquid crystal cured layer is formed on a member such as a support and an alignment film, a surface of the member) and the major axis direction of the liquid crystal compound are parallel to each other. Incidentally, it is not required for the both to be strictly parallel, and in the present specification, the expression means that the both are aligned at an angle formed by the major axis direction of the liquid crystal compound and the main surface of the liquid crystal cured layer of less than 10°.

In the liquid crystal cured layer, the angle formed by the major axis direction of the liquid crystal compound and the main surface of the liquid crystal cured layer is preferably 0 to 5°, more preferably 0 to 3°, and still more preferably 0 to 2°.

The liquid crystal cured layer of the embodiment of the present invention is preferably an optically anisotropic layer, more preferably a positive A-plate or a positive C-plate, and still more preferably the positive A-plate.

Here, the positive A-plate (A-plate which is positive) and the positive C-plate (C-plate which is positive) are defined as follows.

In a case where a refractive index in a film in-plane slow axis direction (in a direction in which an in-plane refractive index is maximum) is defined as nx, a refractive index in an in-plane direction orthogonal to the in-plane slow axis is defined as ny, and a refractive index in a thickness direction is defined as nz, the positive A-plate satisfies the relationship of Expression (A1) and the positive C-plate satisfies the relationship of Expression (C1). In addition, the positive A-plate has an Rth showing a positive value and the positive C-plate has an Rth showing a negative value.

$$nx > ny \approx nz \qquad \text{Expression (A1)}$$

$$nz > nx \approx ny \qquad \text{Expression (C1)}$$

Furthermore, the symbol, "≈", encompasses not only a case where the both sides are completely the same as each other but also a case where the both are substantially the same as each other.

In the expression, "substantially the same", with regard to the positive A-plate, for example, a case where (ny−nz)×d (in which d is the thickness of a film) is −10 to 10 nm, and preferably −5 to 5 nm is also included in "ny≈nz", and a case where (nx−nz)×d is −10 to 10 nm, and preferably −5 to 5 nm is also included in "nx≈nz". In addition, with regard to the positive C-plate, for example, a case where (nx−ny)×d (in which d is the thickness of a film) is 0 to 10 nm, and preferably 0 to 5 nm is also included in "nx≈ny".

In a case where the liquid crystal cured layer of the embodiment of the present invention is a positive A-plate, the Re(550) is preferably 100 to 180 nm, more preferably 120 to 160 nm, still more preferably 130 to 150 nm, and particularly preferably 130 to 145 nm, from the viewpoint that the liquid crystal cured layer functions as a λ/4 plate.

Here, the "λ/4 plate" is a plate having a λ/4 function, specifically, a plate having a function of converting a linearly polarized light at a certain specific wavelength into a circularly polarized light (or converting a circularly polarized light to a linearly polarized light).

The liquid crystal cured layer of the embodiment of the present invention can be used as a polarizer (light absorption anisotropic film) in a case where the liquid crystal composition of the embodiment of the present invention described above contains a dichroic substance.

Optical Film

The optical film of an embodiment of the present invention is an optical film having the liquid crystal cured layer of the embodiment of the present invention.

The structure of the optical film will be described with reference to FIG. 1. FIG. 1 is a schematic cross-sectional view showing an example of the optical film.

Furthermore, FIG. 1 is a schematic view, and the thicknesses relationship, the positional relationship, and the like among the respective layers are not necessarily consistent with actual ones, and either of the support shown in FIG. 1 and an alignment film are optional constitutional members.

An optical film 10 shown in FIG. 1 has a support 16, an alignment film 14, and a liquid crystal cured layer 12 as the cured product of the liquid crystal composition of the embodiment of the present invention in this order.

In addition, the liquid crystal cured layer 12 may be a laminate of two or more different liquid crystal cured layers. For example, in a case where the polarizing plate of the embodiment of the present invention which will be described later is used as a circularly polarizing plate or in a case where the optical film of the embodiment of the present invention is used as an optical compensation film for an in-plane-switching (IPS) method or a fringe-field-switching (FFS) mode liquid crystal display device, the liquid crystal cured layer 12 is preferably a laminate of a positive A-plate and a positive C-plate.

In addition, the liquid crystal cured layer may be peeled from the support, and the liquid crystal cured layer may be used alone as an optical film.

Hereinafter, various members used for the optical film will be described in detail.

Liquid Crystal Cured Layer

The liquid crystal cured layer contained in the optical film of the embodiment of the present invention is the above-mentioned liquid crystal cured layer of the embodiment of the present invention.

In the optical film, a thickness of the liquid crystal cured layer is not particularly limited, but is preferably 0.1 to 10 μm, and more preferably 0.5 to 5 μm.

Support

The optical film may have a support as a base material for forming a liquid crystal cured layer as described above.

Such a support is preferably transparent. Specifically, the light transmittance is preferably 80% or more.

Examples of such a support include a glass substrate and a polymer film. Examples of the material for the polymer film include cellulose-based polymers; acrylic polymers having an acrylic ester polymer such as polymethyl methacrylate and a lactone ring-containing polymer; thermoplastic norbornene-based polymers; polycarbonate-based polymers; polyester-based polymers such as polyethylene terephthalate and polyethylene naphthalate; styrene-based polymers such as polystyrene and an acrylonitrile-styrene copolymer (AS resin); polyolefin-based polymers such as polyethylene, polypropylene, and an ethylene-propylene copolymer; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; and polymers obtained by mixing these polymers.

In addition, an aspect in which a polarizer which will be described later may also function as such a support is also available.

A thickness of the support is not particularly limited, but is preferably 5 to 60 μm, and more preferably 5 to 40 μm.

Alignment Film

In the optical film, the liquid crystal cured layer is preferably formed on a surface of an alignment film (in particular, a photo-alignment film which will be described later). In a case where the optical film has any of the above-mentioned supports, it is preferable that the alignment film may be sandwiched between the support and the liquid crystal cured layer. In addition, an aspect in which the above-mentioned support may also function as an alignment film is also available.

The alignment film may be any film as long as it has a function of horizontally aligning the polymerizable liquid crystal compound included in the composition.

The alignment film generally has a polymer as a main component. Polymer materials for the alignment film are described in many documents, and many commercially available products thereof can be used.

As the polymer material for the alignment film, a polyvinyl alcohol, a polyimide, or a derivative thereof is preferable, and a modified or unmodified polyvinyl alcohol is more preferable.

Examples of the alignment film which may be contained in the optical film include the alignment films described for Line 24 on Page 43 to Line 8 on Page 49 of WO01/88574A; the alignment films consisting of modified polyvinyl alcohols described in paragraphs [0071] to [0095] of JP3907735B; and the liquid crystal alignment film formed by a liquid crystal alignment agent described in JP2012-155308A.

Since an object does not come into contact with a surface of the alignment film upon formation of the alignment film and the deterioration of a surface condition can be prevented, it is preferable to use a photo-alignment film as the alignment film.

The photo-alignment film is not particularly limited, but an alignment film formed by the polymer material such as a polyamide compound and a polyimide compound described in paragraphs [0024] to [0043] of WO2005/096041A; a liquid crystal alignment film formed by the liquid crystal alignment agent having a photo-aligned group described in JP2012-155308A; LPP-JP265CP, trade name, manufactured by Rolic Technologies Ltd.; or the like can be used.

A thickness of the alignment film is not particularly limited, but from the viewpoint of forming a liquid crystal cured layer having a uniform film thickness by relaxing the surface roughness that can be present on the support, the thickness is preferably 0.01 to 10 μm, more preferably 0.01 to 1 μm, and still more preferably 0.01 to 0.5 μm.

Other Liquid Crystal Cured Layers

In the optical film, the liquid crystal cured layer is preferably formed on a surface of other liquid crystal cured layers.

Here, examples of such other liquid crystal cured layers include a liquid crystal cured layer obtained by immobilizing the alignment state of a composition obtained by removing the basic compound from the above-mentioned liquid crystal composition of the embodiment of the present invention. Specific examples of such other liquid crystal cured layers include a liquid crystal cured layer formed by immobilizing the alignment state of a composition containing the above-mentioned liquid crystal compound, polymerization initiator, leveling agent, solvent, and the like; and a liquid crystal cured layer (light absorption anisotropic film) formed by immobilizing the alignment state of a composition containing the above-mentioned liquid crystal compound, polymerization initiator, dichroic substance, leveling agent, and solvent, and the like.

Ultraviolet Absorbing Agent

The optical film preferably includes an ultraviolet (UV) absorbing agent, taking an effect of external light (particularly ultraviolet rays) into consideration.

The ultraviolet absorbing agent may be included in the liquid crystal cured layer or may also be included in a member other than the liquid crystal cured layer, constituting the optical film. Suitable examples of the member other than the liquid crystal cured layer include a support.

As the ultraviolet absorbing agent, any of ultraviolet absorbing agents known in the related art, which can express ultraviolet absorptivity, can be used. Among such the ultraviolet absorbing agents, a benzotriazole-based or hydroxyphenyltriazine-based ultraviolet absorbing agent is preferable from the viewpoint that it has high ultraviolet absorptivity and ultraviolet absorbing ability (ultraviolet-shielding ability) used for an image display device is obtained.

In addition, in order to broaden ultraviolet absorbing ranges, two or more kinds of ultraviolet absorbing agents having different maximum absorption wavelengths are also preferably used.

Examples of the ultraviolet absorbing agent include the compounds described in paragraphs [0258] and [0259] of JP2012-18395A and the compounds described in paragraphs [0055] to [0105] of JP2007-72163A.

In addition, as a commercially available product thereof, for example, Tinuvin 400, Tinuvin 405, Tinuvin 460, Tinuvin 477, Tinuvin 479, and Tinuvin 1577 (all manufactured by BASF), or the like can be used.

Polarizing Plate

A polarizing plate of an embodiment of the present invention is a polarizing plate having the above-mentioned optical film of the embodiment of the present invention.

Here, in a case where the liquid crystal cured layer contained in the optical film of the embodiment of the present invention is not a light absorption anisotropic film, the polarizing plate of the embodiment of the present invention has a polarizer which will be described later or the above-mentioned liquid crystal cured layer of the embodiment of the present invention (provided that the liquid crystal cured layer is limited to a light absorption anisotropic film).

The polarizing plate of the embodiment of the present invention may have another optical film, a protective film which will be described later, or another functional layer, in addition to the above-mentioned optical film of the embodiment of the present invention. The function of the functional layer is not particularly limited, and may be, for example, a layer having functions of an adhesive layer, a stress relaxing layer, a planarizing layer, an antireflection layer, a refractive index adjusting layer, and an ultraviolet absorbing layer, in addition to the above-mentioned alignment film.

The protective film may be used on both sides of the polarizer, or may be used on only one side of the polarizer.

In addition, in a case where the protective film is provided on the same side as the optical film of the embodiment of the present invention, it may be arranged between the polarizer and the optical film, or on the side of the optical film opposite to the polarizer, and the like, via a pressure sensitive adhesive or an adhesive.

In a case where the above-mentioned optically anisotropic layer is a λ/4 plate (positive A-plate), the polarizing plate can be used as a circularly polarizing plate.

In a case where the polarizing plate is used as a circularly polarizing plate, the above-mentioned optically anisotropic layer is used as a λ/4 plate (positive A-plate), and an angle between the slow axis of the λ/4 plate and the absorption axis of a polarizer which will be described later is preferably 30° to 60°, more preferably 40° to 50°, still more preferably 42° to 48°, and particularly preferably 45°.

Here, the "slow axis" of the λ/4 plate means a direction in which the refractive index in the plane of the λ/4 plate is maximum, and the "absorption axis" of the polarizer means a direction in which the absorbance is highest.

In addition, the polarizing plate can also be used as an optical compensation film for an IPS mode or FFS mode liquid crystal display device.

In a case where the polarizing plate is used as an optical compensation film for an IPS mode or FFS mode liquid crystal display device, it is preferable that the above-mentioned optically anisotropic layer is used as at least one plate of a laminate of a positive A-plate and a positive C-plate, an angle formed by the slow axis of the positive A-plate layer and the absorption axis of a polarizer which will be described later are orthogonal or parallel, and specifically, it is more preferable that an angle formed by the slow axis of the positive A-plate layer and the absorption axis of the polarizer which will be described later is 0° to 5° or 85° to 95°.

In addition, in a case where the optical compensation film has a polarizer, a positive C-plate, and a positive A-plate laminated in this order, it is more preferable that an angle formed by the slow axis of the positive A-plate and the absorption axis of the polarizer is parallel to each other.

Similarly, in a case where the optical compensation film has a polarizer, a positive A-plate, and a positive C-plate laminated in this order, it is more preferable that an angle formed by the slow axis of the positive A-plate and the absorption axis of the polarizer is orthogonal to each other.

In a case where the polarizing plate of the embodiment of the present invention is used in a liquid crystal display device which will be described later, it is preferable that an angle formed by the slow axis of the optically anisotropic layer and the absorption axis of a polarizer which will be described later is parallel or orthogonal to each other.

In addition, in the present specification, a term "parallel" does not require that the both are strictly parallel, but means that an angle between one and the other is less than 10°. In addition, in the present specification, a term "orthogonal" does not require that the both are strictly orthogonal, but means that the angle between one and the other is more than 80° and less than 100°.

Polarizer

The polarizer is not particularly limited as long as it is a member having a function of converting light into specific linearly polarized light, and an absorptive type polarizer and a reflective type polarizer, which are known in the related art, can be used.

An iodine-based polarizer, a dye-based polarizer using a dichroic dye, a polyene-based polarizer, or the like is used as the absorptive type polarizer. The iodine-based polarizer and the dye-based polarizer are classified into a coating type polarizer and a stretching type polarizer, any of which can be applied, but a polarizer which is manufactured by allowing polyvinyl alcohol to adsorb iodine or a dichroic dye and performing stretching is preferable.

In addition, examples of a method of obtaining a polarizer by carrying out stretching and dying in a state of a laminated film in which a polyvinyl alcohol layer is formed on a base material include the methods disclosed in JP5048120B, JP5143918B, JP4691205B, JP4751481B, and JP4751486B, and known technologies relating to these polarizers can also be preferably used.

Examples of the coating type polarizer include those in WO2018/124198A, WO2018/186503A, WO2019/132020A, WO2019/132018A, WO2019/189345A, JP2019-197168A, JP2019-194685A, and JP2019-139222A, and known techniques relating to these polarizers can also be preferably used.

A polarizer in which thin films having different birefringence are laminated, a wire grid-type polarizer, a polarizer having a combination of a cholesteric liquid crystal having a selective reflection range, a ¼ wavelength plate, and the like is used as the reflective type polarizer.

Among those, a polymer containing a polyvinyl alcohol-based resin (—$CH_2$—CHOH— as a repeating unit) from the viewpoint that it has more excellent adhesiveness. In particular, a polarizer containing at least one selected from the group consisting of polyvinyl alcohol and an ethylene-vinyl alcohol copolymer) is preferable.

In addition, from the viewpoint of imparting crack resistance, the polarizer may have a depolarization unit formed along the opposite end edges. Examples of the depolarization unit include JP2014-240970A.

In addition, the polarizer may have non-polarizing parts arranged at predetermined intervals in the longitudinal direction and/or the width direction. The non-polarizing part is a decolorized part which is partially decolorized. The arrangement pattern of the non-polarizing parts can be appropriately set according to a purpose. For example, the non-polarizing parts are arranged at a position corresponding to a camera unit of an image display device in a case where a polarizer is cut (cut, punched, or the like) to a predetermined size in order to be attached to the image display device in a predetermined size. Examples of the arrangement pattern of the non-polarizing parts include those in JP2016-27392A.

A thickness of the polarizer is not particularly limited, but is preferably 3 to 60 µm, more preferably 3 to 30 µm, and still more preferably 3 to 10 µm.

Protective Film

A material for the protective film is not particularly limited, and examples thereof include a polyacrylic resin film such as a cellulose acylate film (for example, a cellulose triacetate film, a cellulose diacetate film, a cellulose acetate butyrate film, and a cellulose acetate propionate film), and a polymethyl methacrylate, polyolefins such as polyethylene and polypropylene, polyester-based resin films such as polyethylene terephthalate and polyethylene naphthalate, a polyether sulfone film, a polyurethane-based resin film, a polyester film, a polycarbonate film, a polysulfone film, a polyether film, a polymethylpentene film, a polyether ketone film, a (meth)acrylonitrile film, a polyolefin, a polymer with an alicyclic structure (norbornene-based resin (ARTON: product name, manufactured by JSR Corporation), and an amorphous polyolefin (ZEONEX: product name, manufactured by Nippon Zeon Co., Ltd.)). Among these, the cellulose acylate film is preferable.

The optical characteristics of the protective film are not particularly limited, but in a case where the protective film is provided on the same side as the optical film of the embodiment of the present invention, it is preferable to satisfy the following expression.

$$0 \text{ nm} \leq Re(550) \leq 10 \text{ nm}$$

$$-40 \text{ nm} \leq Rth(550) \leq 40 \text{ nm}$$

Pressure Sensitive Adhesive Layer

In the polarizing plate, a pressure sensitive adhesive layer may be arranged between the liquid crystal cured layer in the optical film and the polarizer.

Examples of a material forming the pressure sensitive adhesive layer used for lamination of the cured product and the polarizer include a member formed of a substance in which a ratio (tan δ=G″/G′) between a storage elastic modulus G′ and a loss elastic modulus G″, each measured with a dynamic viscoelastometer, is 0.001 to 1.5, in which a so-called pressure sensitive adhesive and a readily creepable substance is included. Examples of the pressure sensitive adhesive include a polyvinyl alcohol-based pressure sensitive adhesive, but the pressure sensitive adhesive is not limited thereto.

Adhesive Layer

In the polarizing plate, an adhesive layer may be arranged between the liquid crystal cured layer in the optical film and the polarizer.

As the adhesive layer used for laminating a cured product and a polarizer, a curable adhesive composition that is cured by irradiation with active energy rays or heating is preferable.

Examples of the curable adhesive composition include a curable adhesive composition containing a cationically polymerizable compound and a curable adhesive composition containing a radically polymerizable compound.

A thickness of the adhesive layer is preferably 0.01 to 20 µm, more preferably 0.01 to 10 µm, and still more preferably 0.05 to 5 µm. In a case where the thickness of the adhesive layer is within this range, floating or peeling does not occur between the protective layer or liquid crystal cured layer and the polarizer, which are laminated, and a practically acceptable adhesive force can be obtained. In addition, the thickness of the adhesive layer is preferably 0.4 µm or more from the viewpoint that the generation of air bubbles can be suppressed. Moreover, from the viewpoint of durability, a bulk water absorption rate of the adhesive layer may be adjusted to 10% by mass or less, and is preferably 2% by mass or less. The bulk water absorption rate is measured according to the water absorption rate testing method described in JIS K 7209.

With regard to the adhesive layer, reference can be made to the description in paragraphs [0062] to [0080] of JP2016-35579A, the contents of which are incorporated herein by reference.

Easy Adhesion Layer

In the polarizing plate, an easy adhesion layer may be arranged between the liquid crystal cured layer in the optical film and the polarizer. A storage elastic modulus of the easy adhesion layer at 85° C. is preferably $1.0 \times 10^6$ Pa to $1.0 \times 10^7$ Pa from the viewpoints that the adhesiveness between the liquid crystal cured layer and the polarizer is excellent and the generation of cracks in the polarizer is suppressed. Examples of the constituent material of the easy adhesion layer include a polyolefin-based component and a polyvinyl alcohol-based component. A thickness of the easy adhesion layer is preferably 500 nm to 1 µm.

With regard to the easy adhesion layer, reference can be made to the description in paragraphs [0048] to [0053] of JP2018-36345A, the contents of which are incorporated herein by reference.

Image Display Device

An image display device of an embodiment of the present invention is an image display device having the optical film of the embodiment of the present invention or the polarizing plate of the embodiment of the present invention.

A display element used in the image display device is not particularly limited, and examples thereof include a liquid crystal cell, an organic electroluminescent (hereinafter simply referred to as "electroluminescence (EL)") display panel, and a plasma display panel. Among those, the liquid crystal cell and the organic EL display panel are preferable, and the liquid crystal cell is more preferable.

That is, as the image display device, a liquid crystal display device using a liquid crystal cell as a display element or an organic EL display device using an organic EL display panel as a display element is preferable, and the liquid crystal display device is more preferable.

Liquid Crystal Display Device

A liquid crystal display device which is an example of the image display device is a liquid crystal display device having the above-mentioned polarizing plate and a liquid crystal cell.

Furthermore, it is preferable that the above-mentioned polarizing plate is used as the polarizing plate of the front side, and it is more preferable that the above-mentioned polarizing plate is used as the polarizing plates on the front and rear sides, among the polarizing plates provided on the both sides of the liquid crystal cell.

Hereinafter, the liquid crystal cell constituting the liquid crystal display device will be described in detail.

Liquid Crystal Cell

The liquid crystal cell used in the liquid crystal display device is a vertical alignment (VA) mode, an optically compensated bend (OCB) mode, an in-plane-switching (IPS) mode, a fringe-field-switching (FFS) mode, or a twisted nematic (TN) mode is preferred, but is not limited to these.

In a TN-mode liquid crystal cell, rod-like liquid crystal molecules are substantially horizontally aligned and are twist-aligned at 60° to 120° during no voltage application thereto. A TN-mode liquid crystal cell is most often used in a color TFT liquid crystal display device and described in numerous documents.

In a VA-mode liquid crystal cell, rod-like liquid crystal molecules are substantially vertically aligned during no voltage application thereto. Examples of the VA-mode liquid crystal cell include (1) a VA-mode liquid crystal cell in the narrow sense of the word, in which rod-like liquid crystal molecules are substantially vertically aligned during no voltage application thereto, but are substantially horizontally aligned during voltage application thereto (described in JP1990-176625A (JP-H02-176625A)), (2) an MVA-mode liquid crystal cell in which the VA-mode is multi-domained for viewing angle enlargement (described in SID97, Digest of tech. Papers (preprint), 28 (1997) 845), (3) a liquid crystal cell in a mode (n-ASM mode) in which rod-like liquid crystal molecules are substantially vertically aligned during no voltage application thereto and are multi-domain-aligned during voltage application thereto (described in Seminar of Liquid Crystals of Japan, Papers (preprint), 58-59 (1998)), and (4) a survival-mode liquid crystal cell (announced in LCD International 98). In addition, the liquid crystal cell in the VA mode may be any of a patterned vertical alignment (PVA) type, an optical alignment type, and a polymer-sustained alignment (PSA) type. Details of these modes are specifically described in JP2006-215326A and JP2008-538819A.

In an IPS-mode liquid crystal cell, rod-like liquid crystal molecules are aligned substantially parallel with respect to a substrate, and application of an electric field parallel to the substrate surface causes the liquid crystal molecules to respond planarly. The IPS-mode displays black in a state where no electric field is applied and a pair of upper and lower polarizing plates have absorption axes which are orthogonal to each other. A method of improving the viewing angle by reducing light leakage during black display in an oblique direction using an optical compensation sheet is disclosed in JP1998-54982A (JP-H10-54982A), JP1999-202323A (JP-H11-202323A), JP1997-292522A (JP-H09-292522A), JP1999-133408A (JP-H11-133408A), JP1999-305217A (JP-H11-305217A), JP1998-307291A (JP-H10-307291A), and the like.

Organic EL Display Device

Examples of the organic EL display device which is an example of the image display device include an aspect which includes, from the visible side, a polarizer, a λ/4 plate (a positive A-plate) consisting of the above-mentioned liquid crystal cured layer, and an organic EL display panel in this order.

In addition, the organic EL display panel is a display panel composed of an organic EL device in which an organic light emitting layer (organic electroluminescent layer) is sandwiched between electrodes (between a cathode and an anode). The configuration of the organic EL display panel is not particularly limited but a known configuration is adopted.

EXAMPLES

Hereinbelow, the present invention will be described in more detail with reference to Examples. The materials, the amounts of materials used, the proportions, the treatment details, the treatment procedure, and the like shown in Examples below can be appropriately modified as long as the modifications do not depart from the spirit of the present invention. Therefore, the scope of the present invention should not be construed as being limited to Examples shown below.

Example 1

Manufacture of Protective Film 1
Preparation of Core Layer Cellulose Acylate Dope 1

The following composition was put into a mixing tank and stirred to dissolve the respective components, thereby preparing a core layer cellulose acylate dope 1.

| Core layer cellulose acylate dope 1 | |
| --- | --- |
| Cellulose acetate having a degree of acetyl substitution of 2.88 | 100 parts by mass |
| The following polyester | 12 parts by mass |
| The following durability improver | 4 parts by mass |
| Methylene chloride (the first solvent) | 430 parts by mass |
| Methanol (the second solvent) | 64 parts by mass |

Polyester (number-average molecular weight of 800)

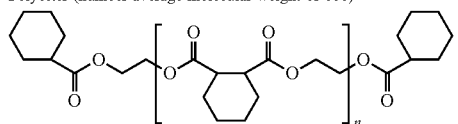

Durability improver

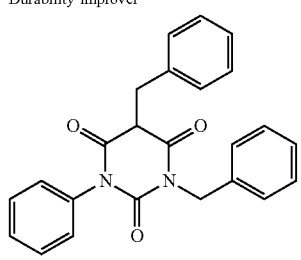

Preparation of Outer Layer Cellulose Acylate Dope 1

10 parts by mass of the following matting agent dispersion liquid 1 was added to 90 parts by mass of the core layer cellulose acylate dope 1 to prepare an outer layer cellulose acylate dope 1.

| Matting agent dispersion liquid 1 | |
|---|---|
| Silica particles with an average particle size of 20 nm (AEROSIL R972, manufactured by Nippon Aerosil Co., Ltd.) | 2 parts by mass |
| Methylene chloride (the first solvent) | 76 parts by mass |
| Methanol (the second solvent) | 11 parts by mass |
| Core layer cellulose acylate dope 1 | 1 part by mass |

Manufacture of Protective Film 1

The core layer cellulose acylate dope 1 and the outer layer cellulose acylate dope 1 were filtered, using a filter paper with an average pore diameter of 34 μm and a sintered metal filter with an average pore diameter of 10 μm. Then, the core layer cellulose acylate dope 1 and the outer layer cellulose acylate dopes 1 on both sides thereof were cast simultaneously on a drum at 20° C. from a casting port in three layers, using a band casting machine.

Subsequently, the film was peeled from the drum in a state where a solvent content of the film on the drum was approximately 20% by mass. Both ends of the obtained film in the width direction were fixed with tenter clips, and the film was dried while being stretched 1.1 times in the width direction in a state where the solvent content of the film was 3% to 15% by mass.

Then, the obtained film was transported between rolls of a heat treatment device and further dried to manufacture a cellulose acylate film 1 with a film thickness of 40 μm, which was used as a protective film 1. The results of measuring a phase difference of the protective film 1 were as follows: Re=1 nm and Rth=−5 nm.

Manufacture of Optically Anisotropic Layer 1

Preparation of Composition 1 for Photo-Alignment Film 8.4 parts by mass of the following copolymer C1 and 0.3 parts by mass of the following thermal acid generator D1 were added to a mixed liquid including 80 parts by mass and 20 parts by mass of butyl acetate and methyl ethyl ketone, respectively, to prepare a composition 1 for a photo-alignment film.

Copolymer C1 (weight-average molecular weight of 40,000)

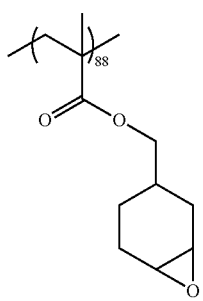

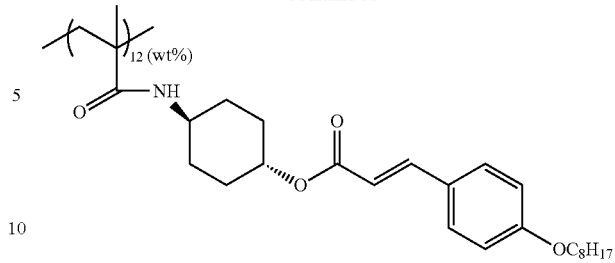

Thermal acid generator D1

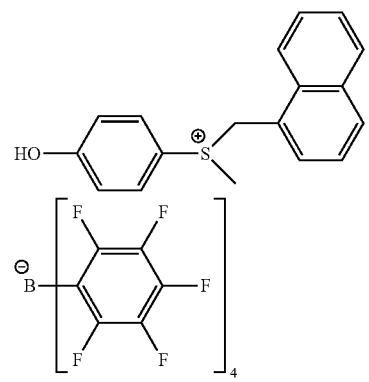

Preparation of Liquid Crystal Composition 1

A liquid crystal composition 1 for forming an optically anisotropic layer having the following composition was prepared.

| Liquid crystal composition 1 | |
|---|---|
| The following liquid crystal compound R1 | 100.00 parts by mass |
| The following basic compound A1 | 0.10 parts by mass |
| The following polymerization initiator S1 | 0.50 parts by mass |
| The following leveling agent P1 | 0.09 parts by mass |
| Cyclopentanone | 179.67 parts by mass |
| Methyl ethyl ketone | 53.67 parts by mass |

Polymerization initiator S1

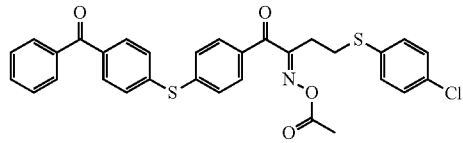 [SMILES: CC(=O)O/N=C(\CCSc1ccc(Cl)cc1)C(=O)c1ccc(Sc2ccc(C(=O)c3ccccc3)cc2)cc1]

Leveling agent P1 (the numbers in the following formula indicate contents (% by mass) of the respect repeating units with respect to all the repeating units in the leveling agent P1).

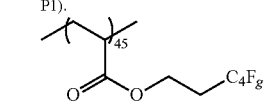

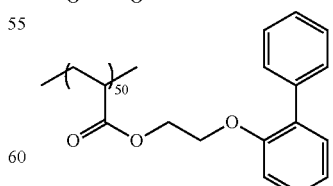

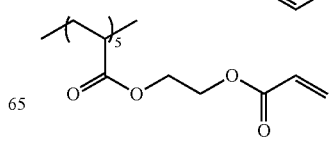

Manufacture of Optically Anisotropic Layer 1

The composition 1 for a photo-alignment film prepared above was continuously applied to one surface of the manufactured cellulose acylate film 1 (protective film 1) with a bar coater. After the application, the solvent was removed by drying in a heating zone at 120° C. for 1 minute to form a 0.3 μm-thick photoisomerizable composition layer. Subsequently, a photo-alignment film was formed through irradiation with polarized ultraviolet rays (10 mJ/cm², using an ultra-high-pressure mercury lamp) while winding a mirror-treated backup roll.

Next, the liquid crystal composition 1 prepared above was applied onto the photo-alignment film formed in a long shape with a bar coater to form a composition layer. In addition, the temperature of the coating chamber was set to 23° C. The formed composition layer was heated to 120° C. in a heating zone and then cooled to 60° C. Thereafter, while maintaining the temperature, the alignment was immobilized by irradiation with ultraviolet rays (300 mJ/cm², using an ultra-high-pressure mercury lamp) in a nitrogen atmosphere (an oxygen concentration of 100 ppm) to form an optically anisotropic layer 1 with a thickness of 2.1 μm.

In a case where the obtained optically anisotropic layer 1 was peeled from the protective film 1 and a phase difference of the optically anisotropic layer 1 was measured, the in-plane retardation Re1(550) was 145 nm and Re1(450)/Re1(550) was 0.83.

Examples 2 to 26

Optically anisotropic layers 2 to 26 of Examples 2 to 26 were manufactured by the same method as in Example 1, except that liquid crystal compounds and non-liquid crystal compounds shown in Table 4 below were used instead of the liquid crystal compounds included in the liquid crystal composition 1.

Furthermore, in a case where the phase difference of the optically anisotropic layer 9 of Example 9 was measured, the in-plane retardation Re(550) and Re(450)/Re(550) were 135 nm and 0.86, respectively.

Example 27

Manufacture of Optically Anisotropic Layer 27
Preparation of Composition 2 for Photo-Alignment Film
A composition 2 for a photo-alignment film having the following composition was prepared.

| Composition 2 for photo-alignment film | |
|---|---|
| The following liquid crystal compound R11 (mixture of rod-like liquid crystal compounds) | 100 parts by mass |
| Acrylate monomer (A-400) | 4.2 parts by mass |
| The following polymer C | 2.0 parts by mass |
| The following compound H | 1.9 parts by mass |
| The photopolymerization initiator S1 | 5.1 parts by mass |
| The following photoacid generator A | 3.0 parts by mass |
| The following polymer D | 0.8 parts by mass |
| Methyl isobutyl ketone | 374 parts by mass |
| Ethyl propionate | 94 parts by mass |

Polymer C (The numerical values in the following formula indicate a content (% by mass) of each repeating unit with respect to all the repeating units in the polymer.)

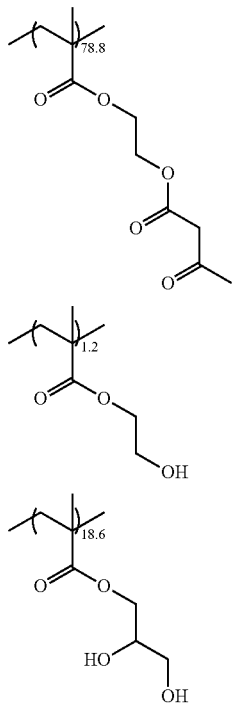

-continued

Composition 2 for photo-alignment film

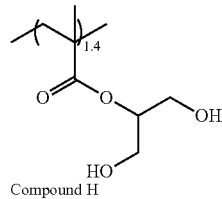
Compound H

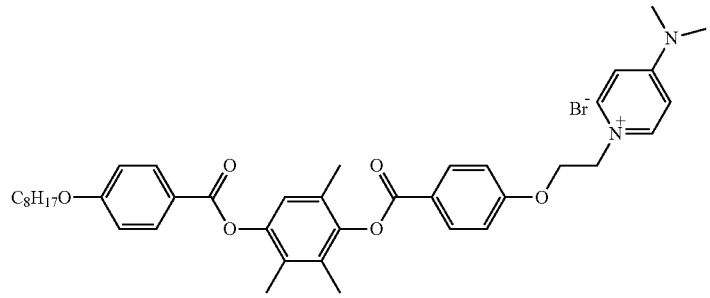
Photoacid generator A

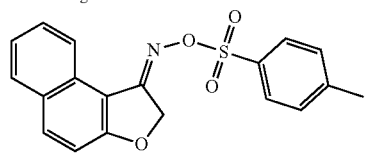

Polymer D (In the following formula: a to c satisfy a:b:c = 17:64:19 and represent a content of each repeating unit with respect to all the repeating units in the polymer.)

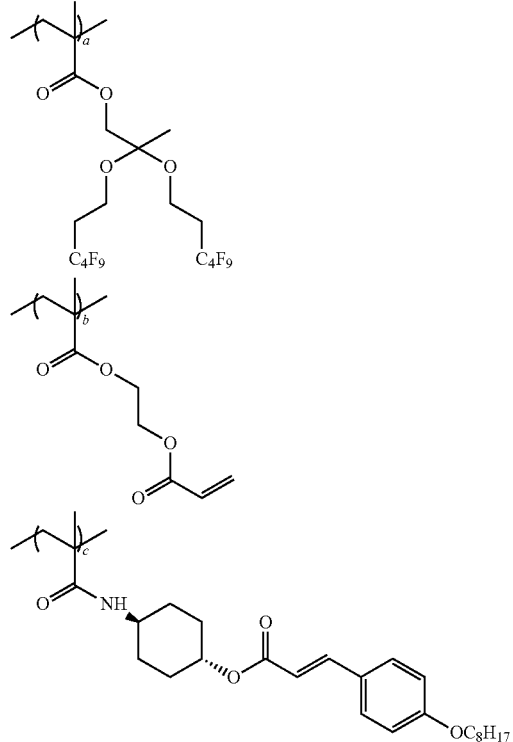

Preparation of Liquid Crystal Composition 27

A liquid crystal composition 27 for forming an optically anisotropic layer was prepared by the same method as in Example 1, except that liquid crystal compounds and non-liquid crystal compounds shown in Table 4 below were used instead of the liquid crystal compound R1 included in the liquid crystal composition 1.

Manufacture of Optically Anisotropic Layer 27

The composition 2 for the photo-alignment film prepared in advance was continuously applied onto a surface on one side of the manufactured cellulose acylate film 1 with a bar coater. After the application, the solvent was removed by drying in a heating zone at 70° C. for 2 minutes, and the residue was irradiated with ultraviolet rays at 150 mJ/cm² in a nitrogen atmosphere (oxygen concentration of 100 ppm). Thereafter, a photo-alignment film 27 having a thickness of 0.4 μm was formed by heating at 120° C. for 1 minute and irradiating with polarized ultraviolet rays (10 mJ/cm², using an ultra-high-pressure mercury lamp) while winding the mirror-treated backup roll. Furthermore, the photo-alignment film 27 was a positive C-plate. The retardation Rth (550) in the thickness direction was −50 nm.

Subsequently, the liquid crystal composition 27 prepared above was applied onto the photo-alignment film formed in a long shape with a bar coater to form a composition layer. In addition, the temperature of the coating chamber was set to 23° C. The formed composition layer was heated to 120° C. in a heating zone and then cooled to 60° C. Thereafter, while maintaining the temperature, the alignment was immobilized by irradiation with ultraviolet rays (300 mJ/cm², using an ultra-high-pressure mercury lamp) in a nitrogen atmosphere (an oxygen concentration of 100 ppm) to form an optically anisotropic layer 27 with a thickness of 2.6 μm.

In a case where the obtained optically anisotropic layer 27 was peeled from the protective film 1 and a phase difference of the optically anisotropic layer 27 was measured, the in-plane retardation Re27(550) was 135 nm and Re27(450)/Re27(550) was 0.86.

Examples 28 and 29

Optically anisotropic layers 28 and 29 of Examples 28 and 29 were manufactured by the same method as in Example 27, except that liquid crystal compounds and non-liquid crystal compounds shown in Table 4 below were used instead of the liquid crystal compounds and the non-liquid crystal compounds included in the liquid crystal composition 27.

Comparative Examples 1 to 7

Optically anisotropic layers C1 to C7 of Comparative Examples 1 to 7 were manufactured by the same method as in Example 1, except that liquid crystal compounds shown in Table 4 below were used instead of the liquid crystal compounds included in the liquid crystal composition 1.

Evaluation

Suppression of Streak Defects

In a case where the optically anisotropic layers were manufactured in Examples 1 to 29 and Comparative Examples 1 to 7, the coated portion in a case where the polymerizable liquid crystal composition was continuously applied was observed and evaluated according to the following evaluation standard. The results are shown in Table 4 below. Furthermore, the streak defects are caused by the precipitates.

Evaluation Standard

A: Even in a case where the application is performed on 3,000 m, streak defects cannot be visible.

B: In a case where the application is performed on 3,000 m, streak defects are slightly visible, but there is no problem in practical use.

C: In a case where the application is performed on 3,000 m, strong streak defects can be visible, which is a problem in practical use.

Liquid Coloration Stability

In Examples 1 to 29 and Comparative Examples 1 to 7, the liquid crystal composition was allowed to age in a 25° C. environment, and the tint was observed. The results of evaluation performed using the following evaluation standard are shown in Table 4 below.

Evaluation Standard

A: A change in the tint cannot be visible even after standing for 5 days.

B: A change in the tint can be visible after standing for 5 days, but there is no problem in practical use.

C: A change in the tint can be strongly visible after standing for 5 days, which is a problem in practical use.

TABLE 4

| | \multicolumn{12}{c|}{Liquid crystal compound} |
| | Type | Content | Type | Content | Type | Content | Type | Content | Type | Content | Type | Content |
|---|---|---|---|---|---|---|---|---|---|---|---|---|
| Example 1 | R1 | 100 | — | — | — | — | — | — | — | — | — | — |
| Example 2 | R2 | 100 | — | — | — | — | — | — | — | — | — | — |
| Example 3 | R2 | 100 | — | — | — | — | — | — | — | — | — | — |
| Example 4 | R2 | 100 | — | — | — | — | — | — | — | — | — | — |
| Example 5 | R2 | 100 | — | — | — | — | — | — | — | — | — | — |
| Example 6 | R2 | 100 | — | — | — | — | — | — | — | — | — | — |
| Example 7 | R2 | 100 | — | — | — | — | — | — | — | — | — | — |
| Example 8 | R2 | — | — | — | — | — | — | — | — | — | — | — |
| Example 9 | R2 | 27 | R3 | 20 | R4 | 20 | R5 | 10.5 | R6 | 16.5 | R7 | 15 |
| Example 10 | R1 | 42 | R4 | 42 | R8 | 4 | R9 | 12 | — | — | — | — |
| Example 11 | R2 | 21.8 | R3 | 45.4 | R4 | 20 | R10 | 4 | R11 | 7.8 | — | — |
| Example 12 | R12 | 100 | — | — | — | — | — | — | — | — | — | — |
| Example 13 | R13 | 100 | — | — | — | — | — | — | — | — | — | — |
| Example 14 | R14 | 100 | — | — | — | — | — | — | — | — | — | — |
| Example 15 | R15 | 100 | — | — | — | — | — | — | — | — | — | — |
| Example 16 | R16 | 100 | — | — | — | — | — | — | — | — | — | — |
| Example 17 | R2 | 100 | — | — | — | — | — | — | — | — | — | — |
| Example 18 | R2 | 100 | — | — | — | — | — | — | — | — | — | — |
| Example 19 | R2 | 100 | — | — | — | — | — | — | — | — | — | — |
| Example 20 | R2 | 100 | — | — | — | — | — | — | — | — | — | — |
| Example 21 | R2 | 100 | — | — | — | — | — | — | — | — | — | — |
| Example 22 | R2 | 100 | — | — | — | — | — | — | — | — | — | — |
| Example 23 | R17 | 100 | — | — | — | — | — | — | — | — | — | — |
| Example 24 | R17 | 80 | R18 | 20 | — | — | — | — | — | — | — | — |
| Example 25 | R2 | 100 | — | — | — | — | — | — | — | — | — | — |
| Example 26 | R2 | 100 | — | — | — | — | — | — | — | — | — | — |
| Example 27 | R2 | 27 | R3 | 20 | R4 | 20 | R5 | 16.5 | R6 | 16.5 | R7 | 15 |
| Example 28 | R1 | 42 | R4 | 42 | R8 | 4 | R9 | 12 | — | — | — | — |

TABLE 4-continued

| | | | | | | | | | | | | | |
|---|---|---|---|---|---|---|---|---|---|---|---|---|---|
| Example 29 | R2 | 16.1 | R3 | 21.2 | R4 | 39 | R5 | 8.5 | R7 | 15.2 | — | — | |
| Comparative Example 1 | R1 | 100 | — | — | — | — | — | — | — | — | — | — | |
| Comparative Example 2 | R2 | 100 | — | — | — | — | — | — | — | — | — | — | |
| Comparative Example 3 | R1 | 100 | — | — | — | — | — | — | — | — | — | — | |
| Comparative Example 4 | R1 | 100 | — | — | — | — | — | — | — | — | — | — | |
| Comparative Example 5 | R1 | 100 | — | — | — | — | — | — | — | — | — | — | |
| Comparative Example 6 | R1 | 100 | — | — | — | — | — | — | — | — | — | — | |
| Comparative Example 7 | R1 | 100 | — | — | — | — | — | — | — | — | — | — | |

| | Non-liquid crystal compound | | Basic compound | | | | Evaluation | |
|---|---|---|---|---|---|---|---|---|
| | Type | Content | Type | Content | pKa | Expression (i) | Streak defects | Temporal stability |
| Example 1 | — | — | A1 | 0.10 | 7.0 | $9.1 \times 10^{-9}$ | A | A |
| Example 2 | — | — | A1 | 0.008 | 7.0 | $7.3 \times 10^{-10}$ | B | A |
| Example 3 | — | — | A1 | 0.01 | 7.0 | $9.1 \times 10^{-10}$ | A | A |
| Example 4 | — | — | A1 | 0.10 | 7.0 | $9.1 \times 10^{-9}$ | A | A |
| Example 5 | — | — | A1 | 0.50 | 7.0 | $4.6 \times 10^{-8}$ | A | A |
| Example 6 | — | — | A1 | 1.00 | 7.0 | $9.1 \times 10^{-8}$ | A | A |
| Example 7 | — | — | A1 | 5.00 | 7.0 | $4\ 6 \times 10^{-7}$ | A | A |
| Example 8 | — | — | A1 | 10.00 | 7.0 | $9.1 \times 10^{-7}$ | A | B |
| Example 9 | M1 | 3 | A1 | 0.05 | 7.0 | $4.6 \times 10^{-9}$ | A | A |
| Example 10 | M2 | — | A1 | 0.03 | 7.0 | $2.7 \times 10^{-9}$ | A | A |
| Example 11 | — | — | A1 | 0.03 | 7.0 | $2.7 \times 10^{-9}$ | A | A |
| Example 12 | — | — | A1 | 0.10 | 7.0 | $9.1 \times 10^{-9}$ | A | A |
| Example 13 | — | — | A1 | 0.10 | 7.0 | $9\ 1 \times 10^{-9}$ | A | A |
| Example 14 | — | — | A1 | 0.10 | 7.0 | $9.1 \times 10^{-9}$ | A | A |
| Example 15 | — | — | A1 | 0.10 | 7.0 | $9.1 \times 10^{-9}$ | A | A |
| Example 16 | — | — | A1 | 0.10 | 7.0 | $9.1 \times 10^{-9}$ | A | A |
| Example 17 | — | — | A2 | 0.10 | 7.4 | $2.7 \times 10^{-8}$ | A | A |
| Example 18 | — | — | A3 | 0.10 | 7.0 | $1.1 \times 10^{-8}$ | A | A |
| Example 19 | — | — | A4 | 0.20 | 4.9 | $1.7 \times 10^{-10}$ | A | A |
| Example 20 | — | — | A5 | 0.05 | 9.1 | $5.6 \times 10^{-7}$ | A | A |
| Example 21 | — | — | A6 | 0.10 | 5.1 | $1.2 \times 10^{-10}$ | A | B |
| Example 22 | — | — | A7 | 0.10 | 7.8 | $5.9 \times 10^{-8}$ | A | B |
| Example 23 | — | — | A1 | 0.10 | 7.0 | $9.1 \times 10^{-9}$ | B | A |
| Example 24 | — | — | A1 | 0.10 | 7.0 | $9.1 \times 10^{-9}$ | B | A |
| Example 25 | — | — | A4 | 0.05 | 4.9 | $4.4 \times 10^{-10}$ | B | A |
| Example 26 | — | — | A5 | 1.00 | 9.1 | $1.1 \times 10^{-5}$ | A | B |
| Example 27 | M1 | 3 | A1 | 0.26 | 7.0 | $2.4 \times 10^{-8}$ | A | A |
| Example 28 | M2 | 10 | A1 | 0.30 | 7.0 | $2.7 \times 10^{-8}$ | A | A |
| Example 29 | — | — | A1 | 0.26 | 7.0 | $2.4 \times 10^{-8}$ | A | A |
| Comparative Example 1 | — | — | — | — | — | — | C | A |
| Comparative Example 2 | — | — | — | — | — | — | C | A |
| Comparative Example 3 | — | — | A8 | 0.10 | 3.6 | $4.0 \times 10^{-12}$ | C | A |
| Comparative Example 4 | — | — | A9 | 0.10 | 13.3 | $2..0 \times 10^{-2}$ | A | C |
| Comparative Example 5 | — | — | A10 | 0.10 | 11.0 | $1.0 \times 10^{-4}$ | A | C |
| Comparative Example 6 | — | — | A11 | 0.10 | 11.4 | $2.2 \times 10^{-4}$ | A | C |
| Comparative Example 7 | — | — | A12 | 0.10 | 2.6 | $3.6 \times 10^{-13}$ | C | A |

The structures of the liquid crystal compounds, the non-liquid crystal compounds, and the basic compounds in Table 4 are shown below.
Liquid crystal compound R1 [Δn(450)/Δn(550): 0.83]

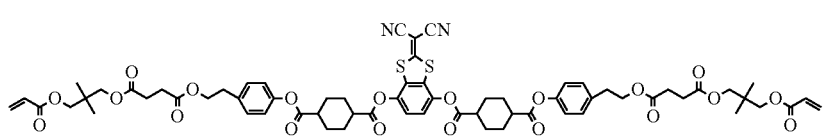 [SMILES: C=CC(=O)OCC(C)(C)COC(=O)CCC(=O)OCCc1ccc(OC(=O)C2CCC(C(=O)Oc3ccc(OC(=O)C4CCC(C(=O)Oc5ccc(CCOC(=O)CCC(=O)OCC(C)(C)COC(=O)C=C)cc5)CC4)c4c3SC(=C(C#N)C#N)S4)CC2)cc1]

TABLE 4-continued
Liquid crystal compound R2 [Δn(450)/Δn(550): 0.58]
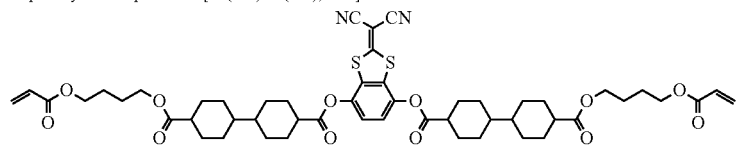
Liquid crystal compound R3 [Δn(450)/Δn(550): 0.68]
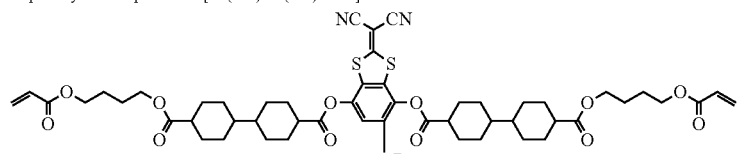
Liquid crystal compound R4 [Δn(450)/Δn(550): 0.80]
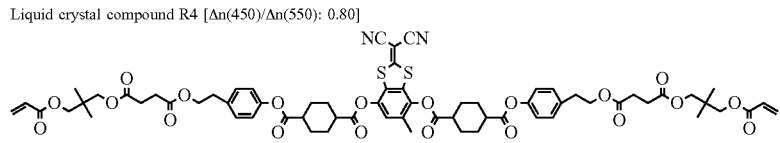
Liquid crystal compound R5 [Δn(450)/Δn(550): 1.03]
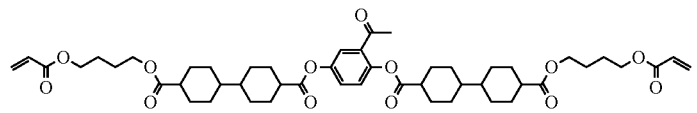 [SMILES: C=CC(=O)OCCCCOC(=O)C1CCC(C2CCC(C(=O)Oc3ccc(OC(=O)C4CCC(C5CCC(C(=O)OCCCCOC(=O)C=C)CC5)CC4)c(C(C)=O)c3)CC2)CC1]
Liquid crystal compound R6 [Δn(450)/Δn(550): 1.02]
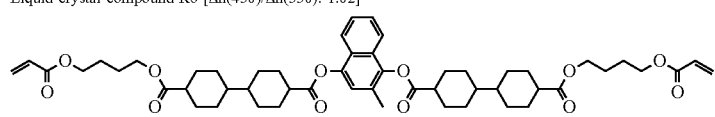
Liquid crystal compound R7 [Δn(450)/Δn(550): 1.03]
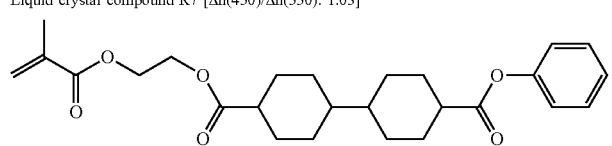
Liquid crystal compound R8 [Δn(450)/Δn(550): 1.04]
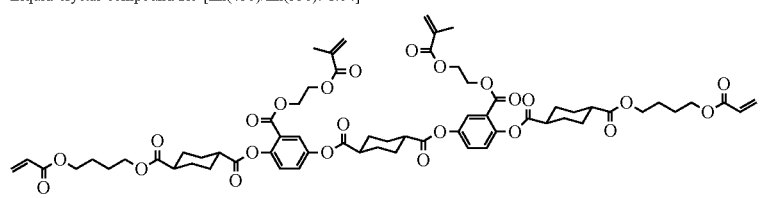
Liquid crystal compound R9 [Δn(450)/Δn(550): 1.05]
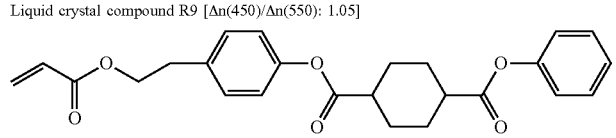
Liquid crystal compound R10 [Δn(450)/Δn(550): 1.04]
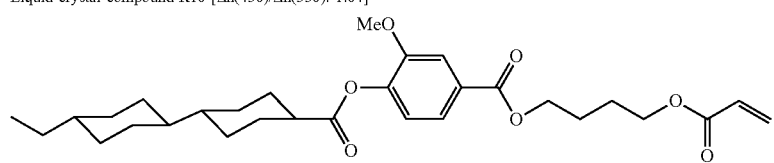
Liquid crystal compound R11 [Δn(450)/Δn(550): 1.10]
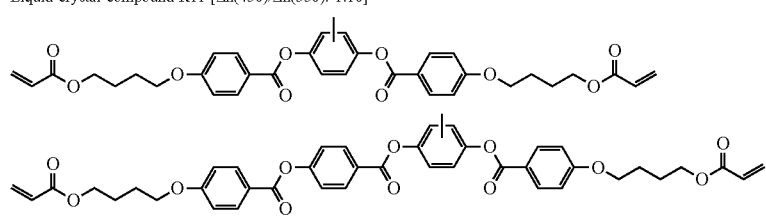

TABLE 4-continued
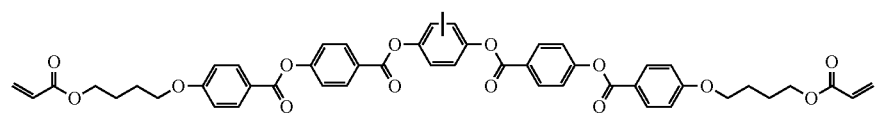
Liquid crystal compound K12 [Δn(450) Δn(550): 0.83]
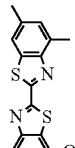
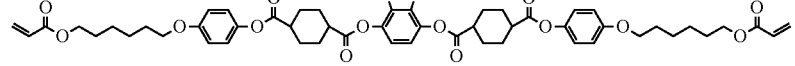
Liquid crystal compound R13 [Δn(450)/Δn(550): 0.83]
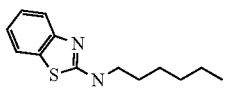
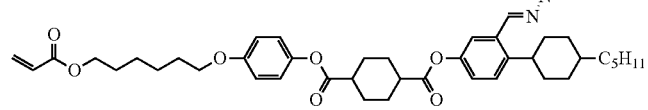
Liquid crystal compound R14 [Δn(450)/Δn(550): 0.75]
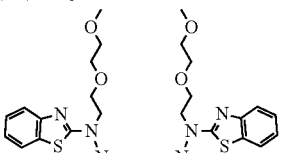
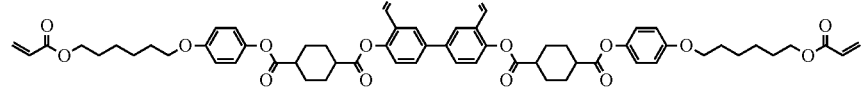
Liquid crystal compound R15 [Δn(450)/Δn(550): 0.82]
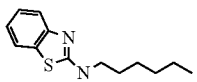
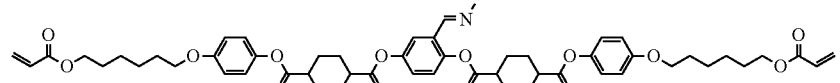
Liquid crystal compound R16 [Δn(450)/Δn(550): 0.83]
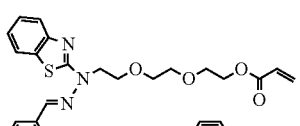
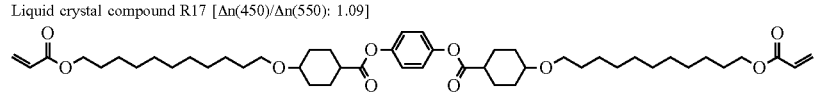
Liquid crystal compound R17 [Δn(450)/Δn(550): 1.09]
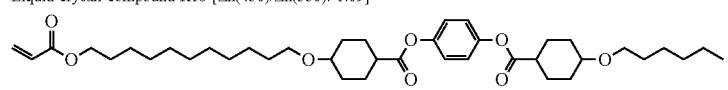
Liquid crystal compound R18 [Δn(450)/Δn(550): 1.09]
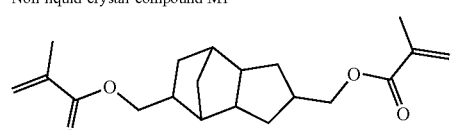
Non-liquid crystal compound M1
Non-liquid crystal compound M2
Non-liquid crystal compound TABLE 4-continued Basic Compound A1

Basic Compound A2
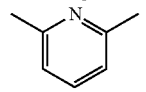

Basic Compound A3
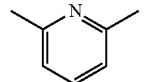

Basic Compound A4
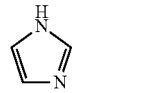

Basic Compound A5
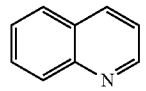

Basic Compound A6

Basic Compound A7
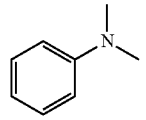

Basic Compound A8
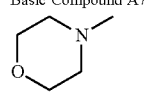

Basic Compound A9
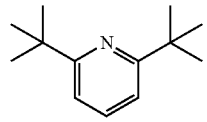

Basic Compound A10
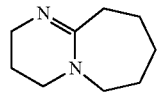

Basic Compound A11
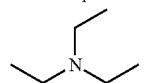

Basic Compound A12
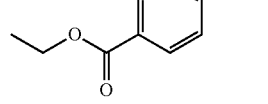

From the results shown in Table 4 above, it was found that streak defects could not be suppressed in a case where the basic compound was not blended (Comparative Examples 1 and 2).

Moreover, it was found that even in a case where a basic compound was blended, streak defects could not be suppressed in a case where a basic compound whose conjugate acid has a pKa of less than 4 was used (Comparative Examples 3 and 7).

In addition, it was found that even in a case where a basic compound was blended, the temporal stability was deteriorated in a case where a basic compound whose conjugate acid has a pKa of more than 10 was used (Comparative Examples 4 to 6).

In contrast, it was found that the streak defects were suppressed and the temporal stability was also good in a case where a basic compound whose conjugate acid has a pKa of 4 to 10 was blended (Examples 1 to 29).

Moreover, from the comparison of Examples 2 to 8, it was found that the streak defects were further suppressed and the temporal stability was improved in a case where the content of the basic compound was 0.01 to 5 parts by mass with respect to 100 parts by mass of the liquid crystal compound.

Furthermore, from the comparison of Examples 4 and 17 to 22, it was found that the temporal stability was improved in a case where the basic compound was a heterocyclic amine compound.

Moreover, from the comparison of Examples 1, 4, and 23 to 24, it was found that the streak defects were further suppressed in a case where the liquid crystal compound satisfied Expression (ii).

In addition, from the comparison of Examples 3 to 6 and Examples 25 to 26, it was found that the streak defects were further suppressed and the temporal stability was improved in a case where the content of the basic compound satisfied Expression (i).

The optically anisotropic layer 9 manufactured in Example 9 was applied onto a liquid crystal display device by the method shown below, and thus, sufficient display performance as an optical compensation film was confirmed.

Manufacture of Optically Anisotropic Layer 51

Preparation of Polymerizable Liquid Crystal Composition 51

A polymerizable liquid crystal composition 51 for forming an optically anisotropic layer 51 having the following composition was prepared.

| Polymerizable liquid crystal composition 51 | |
| --- | --- |
| The liquid crystal compound R2 | 24.5 parts by mass |
| The liquid crystal compound R3 | 24.5 parts by mass |
| The liquid crystal compound R4 | 10.0 parts by mass |
| The liquid crystal compound R5 | 20.5 parts by mass |
| The liquid crystal compound R6 | 20.5 parts by mass |
| The liquid crystal compound R7 | 15.0 parts by mass |
| The following compound B1 | 3.0 parts by mass |
| The following compound C1 | 8.0 parts by mass |
| The polymerization initiator S1 | 3.0 parts by mass |
| The following leveling agent P2 | 0.3 parts by mass |
| The following leveling agent P3 | 0.3 parts by mass |
| Cyclopentanone | 232.9 parts by mass |
| Methyl ethyl ketone | 105.9 parts by mass |
| Methanol | 19.4 parts by mass |
| Isopropyl alcohol | 19.41 parts by mass |

Compound B1

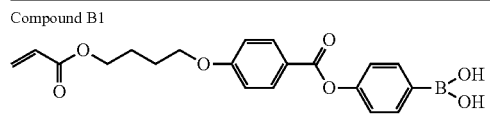

-continued

Polymerizable liquid crystal composition 51

Compound C1 (mixture of the following compounds)

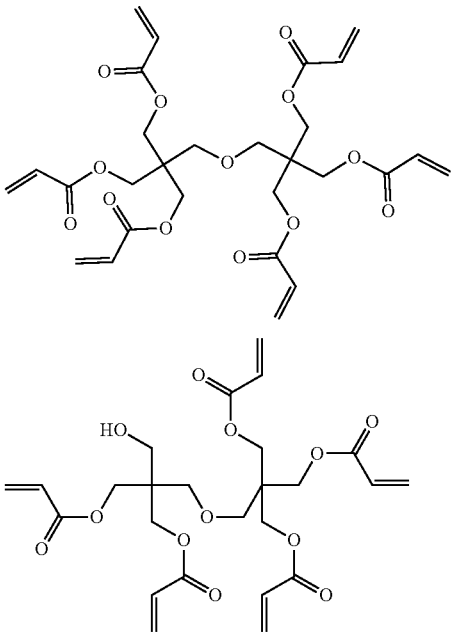

Leveling agent P2 [weight-average molecular weight: 15,000, the numerical values in the following formulae each indicate a content (% by mass) of each repeating unit with respect to all the repeating units]

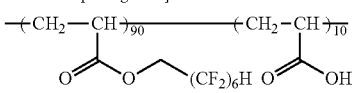

Leveling agent P3 [weight-average molecular weight: 11,200, the numerical values in the following formulae each indicate a content (% by mass) of each repeating unit with respect to all the repeating units]

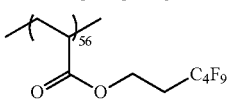

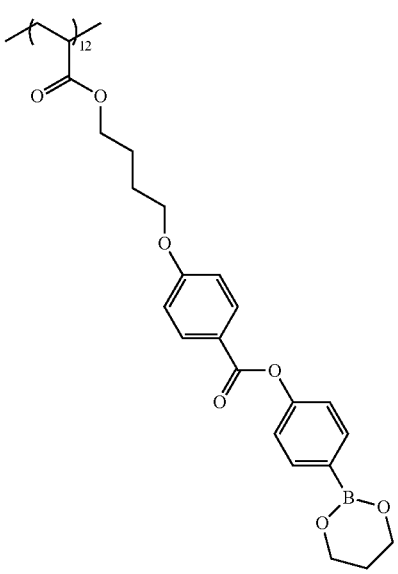

Polymerizable liquid crystal composition 51

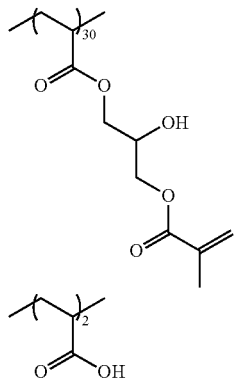

Manufacture of Optically Anisotropic Layer 51

A surface of the optical film manufactured in Example 9, before peeling from the protective film, on the optically anisotropic layer 9 side was subjected to a corona treatment with a discharge amount of 150 W-min/m$^2$, and the polymerizable liquid crystal composition 51 previously prepared was applied onto the corona-treated surface with a bar coater to form a composition layer.

Subsequently, heating was performed with hot air at 85° C. for 60 seconds in order to dry the solvent of the composition and subject the liquid crystal compound to alignment-aging. The alignment was immobilized through irradiation with ultraviolet rays (150 mJ/cm$^2$) at an oxygen concentration of 100 ppm under a nitrogen purge at 50° C. to manufacture an optically anisotropic layer C1 having a thickness of 2.0 μm, and optical films 9 to 51 having a protective film 1, a photo-alignment film 1, an optically anisotropic layer 9, and an optically anisotropic layer 51 in this order were obtained.

Furthermore, the protective film 1 and the photo-alignment film 1 were peeled from the manufactured phase difference film, the phase difference of the laminate (the optically anisotropic layer 51/the optically anisotropic layer 9) was measured, the previously measured phase difference of the optically anisotropic layer 9 was subtracted therefrom to calculate a phase difference of the optically anisotropic layer 51, and thus, it was confirmed that the retardation Rth(550) in the thickness direction was −90 nm and the optically anisotropic layer 51 was a positive C-plate.

Manufacture of Protective Film 2

The following composition was put into a mixing tank and stirred under heating to dissolve the respective components to prepare a cellulose acetate solution.

| Cellulose acetate solution | |
|---|---|
| Cellulose acetate having an acetylation degree of 60.7% to 61.1% | 100 parts by mass |
| Triphenyl phosphate (plasticizer) | 7.8 parts by mass |
| Biphenyl diphenyl phosphate (plasticizer) | 3.9 parts by mass |
| Methylene chloride (the first solvent) | 336 parts by mass |
| Methanol (the second solvent) | 29 parts by mass |
| 1-Butanol (the third solvent) | 11 parts by mass |

16 parts by mass of the following retardation increasing agent (A), 92 parts by mass of methylene chloride, and 8 parts by mass of methanol were put into another mixing tank, and the mixture was stirred under heating to prepare a retardation increasing agent solution. 474 parts by mass of a cellulose acetate solution was mixed with 25 parts by mass of a retardation increasing agent solution, and the mixture was sufficiently stirred to prepare a dope. The amount of the retardation increasing agent added was 6.0 parts by mass with respect to 100 parts by mass of cellulose acetate.

Retardation increaing agent (A)

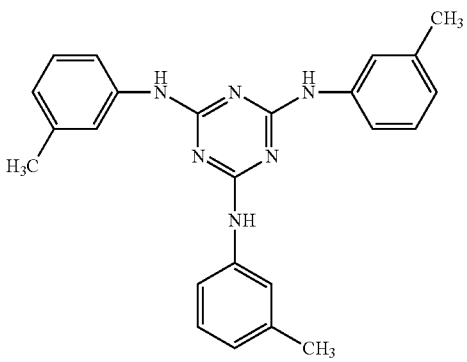

The obtained dope was cast using a band drawing machine. After the film surface temperature on the band reaches 40° C., the film was dried with hot air at 70° C. for 1 minute, and the film was dried from the band with dry air at 140° C. for 10 minutes to manufacture having a triacetyl cellulose film having a residual solvent amount of 0.3% by mass. A film thickness thereof was 41 μm. This film was taken as a protective film 2.

As a result of the measurement of the phase difference of the protective film 2, Re=1 nm and Rth=40 nm were obtained.

Saponification Treatment of Protective Film 2

The protective film 2 prepared above was immersed in a 2.3 mol/L aqueous sodium hydroxide solution at 55° C. for 3 minutes. Then, the film was washed in a water-washing bath at room temperature and neutralized at 30° C. with 0.05 mol/L sulfuric acid. The film was washed again in a water-washing bath at room temperature, and further dried with hot air at 100° C., and a surface of the protective film 2 was saponified.

Manufacture of Polarizing Plate

The saponified protective film 2 manufactured above, a polyvinyl alcohol-based polarizer, and the optical films 9 to 51 manufactured were affixed with each other, using an adhesive, so that the absorption axis of the polarizer and the slow axis of the optical films 9 to 51 were in parallel directions and the optically anisotropic layer 51 side of the optical films 9 to 51 was on the polarizer side, and then the protective film 1 and the photo-alignment film 1 were peeled, thereby manufacturing a first polarizing plate. Furthermore, a 3% aqueous PVA solution (manufactured by Kuraray Co., Ltd., PVA-117H) was used as the adhesive.

In addition, a second polarizing plate was manufactured by similarly affixing a saponified protective film 2, a polyvinyl alcohol-based polaizer, and the saponified protective film 1 in the same procedure.

Further, a surface of the second polarizing plate on the protective film 1 side and surfaces of the optical films 9 to 51 on the optically anisotropic layer 51 side were affixed to each other, using a pressure sensitive adhesive (SK2057 manufactured by Soken Kagaku Co., Ltd.), so that the absorption axis of the polarizer and the slow axis of the optical films 9 to 51 were parallel to each other, and then the protective film 1 of the optical films 9 to 51 and the photo-alignment film 1 were peeled, thereby manufacturing a third polarizing plate in which the protective film 2, the polarizer, the protective film 1, the optically anisotropic layer 51, and the optically anisotropic layer 9 were laminated in this order.

Manufacture of Liquid Crystal Display Device 1

A commercially available liquid crystal display device (iPad, manufactured by Apple Inc.) was disassembled, a double-sided polarizing plate affixed thereto was peeled, a first polarizing plate was arranged on a visible side, and a second polarizing plate was arranged on a backlight side, thereby manufacturing a liquid crystal display device 1. At this time, the affixing was performed, using a pressure sensitive adhesive (SK2057 manufactured by Soken Kagaku Co., Ltd.), so that the optically anisotropic layer 9 side in the phase difference film of the first polarizing plate and the protective film 1 side of the second polarizing plate were on the liquid crystal cell side. In addition, at this time, the affixing was performed so that the slow axis of the liquid crystal in the cell and the absorption axis of the first polarizing plate were orthogonal to each other, and the slow axis of the liquid crystal in the cell and the absorption axis of the second polarizing plate are parallel to each other.

In the liquid crystal display devices 1 and 2 thus manufactured, it was confirmed that the optical film of the embodiment of the present invention has sufficient performance as an optical compensation film.

Manufacture of Liquid Crystal Display Device 2

A liquid crystal display device 2 was manufactured by the same procedure as that of the liquid crystal display device 1, except that a third polarizing plate was used instead of the first polarizing plate.

In the liquid crystal display devices 1 and 2 thus manufactured, it was confirmed that the optical film of the embodiment of the present invention has sufficient performance as an optical compensation film.

EXPLANATION OF REFERENCES

10: optical film
12: liquid crystal cured layer
14: alignment film
16: support

What is claimed is:

1. A liquid crystal composition comprising:
a liquid crystal compound; and
a basic compound,
wherein a pKa of a conjugate acid of the basic compound is 4 to 10.

2. The liquid crystal composition according to claim 1, wherein a content of the basic compound is 0.01 to 5 parts by mass with respect to 100 parts by mass of the liquid crystal compound.

3. The liquid crystal composition according to claim 1, wherein the liquid crystal composition satisfies Expression (i), $$1.0 \times 10^{-10} < a \times 10^{-(14-pKa)} < 1.0 \times 10^{-6} \quad \text{(i)}$$

in Expression (i),
a represents a content of the basic compound and represents an amount in parts by mass with respect to 100 parts by mass of the liquid crystal compound, and
pKa represents an acid dissociation constant of the conjugate acid of the basic compound.

4. The liquid crystal composition according to claim 1, wherein the basic compound is a heterocyclic amine compound.

5. The liquid crystal composition according to claim 1, wherein the basic compound is an aromatic heterocyclic amine compound.

6. The liquid crystal composition according to claim 1, wherein the liquid crystal compound has a polymerizable group.

7. The liquid crystal composition according to claim 1, wherein the liquid crystal compound is a compound represented by Formula (I),

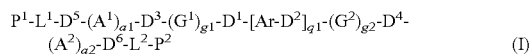

$$P^1\text{-}L^1\text{-}D^5\text{-}(A^1)_{a1}\text{-}D^3\text{-}(G^1)_{g1}\text{-}D^1\text{-}[Ar\text{-}D^2]_{q1}\text{-}(G^2)_{g2}\text{-}D^4\text{-}(A^2)_{a2}\text{-}D^6\text{-}L^2\text{-}P^2 \quad \text{(I)}$$

in Formula (I),
a1, a2, g1, and g2 each independently represent 0 or 1, provided that at least one of a1 or g1 represents 1, and at least one of a2 or g2 represents 1,
q1 represents 1 or 2,
$D^1$, $D^2$, $D^3$, $D^4$, $D^5$, and $D^6$ each independently represent a single bond, or —CO—, —O—, —S—, —C(=S)—, —$CR^1R^2$—, —$CR^3$=$CR^4$—, —NR—, or a divalent linking group consisting of a combination of two or more of these groups, where $R^1$ to $R^5$ each independently represent a hydrogen atom, a fluorine atom, or an alkyl group having 1 to 12 carbon atoms, provided that in a case where q1 is 2, a plurality of $D^2$'s may be the same as or different from each other,
$G^1$ and $G^2$ each independently represent an aromatic ring having 6 to 20 carbon atoms, which may have a substituent, or a divalent alicyclic hydrocarbon group having 5 to 20 carbon atoms, which may have a substituent, and one or more of —$CH_2$—'s constituting the alicyclic hydrocarbon group may be substituted with —O—, —S—, or —NH—,
$A^1$ and $A^2$ each independently represent an aromatic ring having 6 to 20 carbon atoms, which may have a substituent, or a divalent alicyclic hydrocarbon group having 5 to 20 carbon atoms, which may have a substituent, and one or more of —$CH_2$—'s constituting the alicyclic hydrocarbon group may be substituted with —O—, —S—, or —NH—,
$L^1$ and $L^2$ each independently represent a single bond, a linear alkylene group having 1 to 14 carbon atoms, a branched alkylene group having 3 to 14 carbon atoms, or a divalent linking group in which one or more of —$CH_2$—'s constituting the linear or branched alkylene group are substituted with —O—, —S—, —NH—, —N(Q)-, or —CO—, where Q represents a substituent,
$P^1$ and $P^2$ each independently represent a monovalent organic group, and at least one of $P^1$ or $P^2$ represents a polymerizable group, and
Ar represents an aromatic ring having 6 to 20 carbon atoms, which may have a substituent, or a divalent alicyclic hydrocarbon group having 5 to 20 carbon atoms, which may have a substituent, and one or more of —$CH_2$—'s constituting the alicyclic hydrocarbon group may be substituted with —O—, —S—, or —NH—, provided that in a case where q1 is 2, a plurality of Ar's may be the same as or different from each other.

8. The liquid crystal composition according to claim 1, wherein the liquid crystal compound is a rod-like liquid crystal compound, and a refractive index difference Δn between a major axis direction and a minor axis direction of the rod-like liquid crystal compound satisfies Expression (ii), $$\Delta n(450)/\Delta n(550) < 1.0 \quad \text{(ii)}$$

in Expression (ii), Δn(450) represents a refractive index difference at 450 nm, and Δn(550) represents a refractive index difference at 550 nm.

9. The liquid crystal composition according to claim 1, wherein the liquid crystal compound has any of aromatic rings selected from the group consisting of groups represented by Formulae (Ar-1) to (Ar-5),

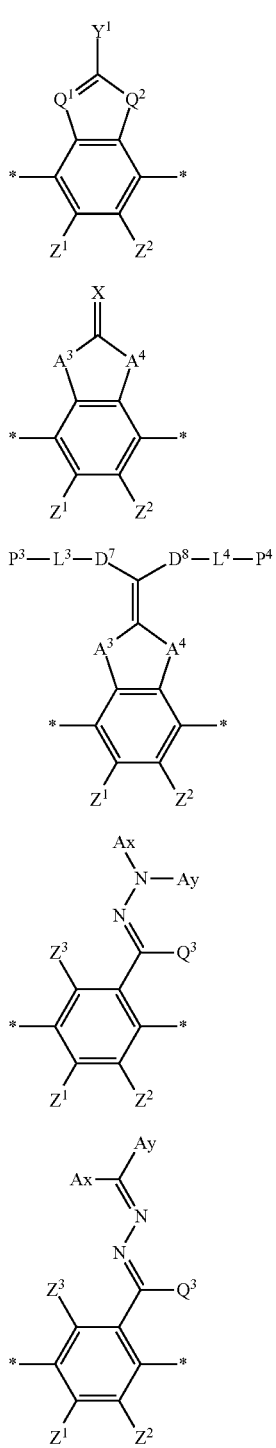

in Formulae (Ar-1) to (Ar-5),
* represents a bonding position,
$Q^1$ represents N or CH,
$Q^2$ represents —S—, —O—, or —N($R^6$)—, where $R^6$ represents a hydrogen atom or an alkyl group having 1 to 6 carbon atoms,
$Y^1$ represents an aromatic hydrocarbon group having 6 to 12 carbon atoms, which may have a substituent, an aromatic heterocyclic group having 3 to 12 carbon atoms, which may have a substituent, or an alicyclic hydrocarbon group having 6 to 20 carbon atoms, which may have a substituent, and one or more of —CH$_2$—'s constituting the alicyclic hydrocarbon group may be substituted with —O—, —S—, or —NH—,
$Z^1$, $Z^2$, and $Z^3$ each independently represent a hydrogen atom, a monovalent aliphatic hydrocarbon group having 1 to 20 carbon atoms, a monovalent alicyclic hydrocarbon group having 3 to 20 carbon atoms, a monovalent aromatic hydrocarbon group having 6 to 20 carbon atoms, a monovalent aromatic heterocyclic group having 6 to 20 carbon atoms, a halogen atom, a cyano group, a nitro group, —O$R^7$, —N$R^8R^9$, —S$R^{10}$, —COO$R^{11}$, or —CO$R^{11}$, where $R^7$ to $R^{12}$ each independently represent a hydrogen atom or an alkyl group having 1 to 6 carbon atoms, and $Z^1$ and $Z^2$ may be bonded to each other to form an aromatic ring,
$A^3$ and $A^4$ each independently represent a group selected from the group consisting of —O—, —N($R^{13}$)—, —S—, and —CO—, where $R^3$ represents a hydrogen atom or a substituent,
X represents a hydrogen atom or a non-metal atom of Groups XIV to XVI to which a substituent may be bonded,
$D^7$ and $D^8$ each independently represent a single bond, or —CO—, —O—, -S—, —C(=S)—, —C$R^1R^2$—, —C$R^3$—C$R^4$—, —N$R^5$—, or a divalent linking group consisting of a combination of two or more of these groups, where $R^1$ to $R^5$ each independently represent a hydrogen atom, a fluorine atom, or an alkyl group having 1 to 12 carbon atoms,
$L^3$ and $L^4$ each independently represent a single bond, a linear alkylene group having 1 to 14 carbon atoms, a branched alkylene group having 3 to 14 carbon atoms, or a divalent linking group in which one or more of —CH$_2$—'s constituting the linear or branched alkylene group are substituted with —O—, —S—, —NH—, —N(Q)-, or —CO—, where Q represents a substituent,
$P^3$ and $P^4$ each independently represent a monovalent organic group, and at least one of $P^3$ or $P^4$ represents a polymerizable group,
Ax represents an organic group having 2 to 30 carbon atoms, which has at least one aromatic ring selected from the group consisting of an aromatic hydrocarbon ring and an aromatic heterocyclic ring,
Ay represents a hydrogen atom, an alkyl group having 1 to 12 carbon atoms, which may have a substituent, or an organic group having 2 to 30 carbon atoms, which has at least one aromatic ring selected from the group consisting of an aromatic hydrocarbon ring and an aromatic heterocyclic ring,
the aromatic ring in each of Ax and Ay may have a substituent, and Ax and Ay may be bonded to each other to form a ring, and
$Q^3$ represents a hydrogen atom or an alkyl group having 1 to 20 carbon atoms, which may have a substituent.

10. A liquid crystal cured layer obtained by immobilizing an alignment state of the liquid crystal composition according to claim 1.

11. An optical film comprising:
the liquid crystal cured layer according to claim 10.

12. The optical film according to claim 11,
wherein the liquid crystal cured layer is formed on a surface of a photo-alignment film.

13. The optical film according to claim 11,
wherein the liquid crystal cured layer is formed on a surface of another liquid crystal cured layer.

14. A polarizing plate comprising:
the optical film according to claim 11.

15. An image display device comprising:
the optical film according to claim 11.

16. An image display device comprising:
the polarizing plate according to claim 14.

17. The image display device according to claim 15,
wherein the image display device is a liquid crystal display device.

18. The image display device according to claim 15,
wherein the image display device is an organic EL display device.

* * * * *